United States Patent
Udou

(10) Patent No.: US 7,325,080 B2
(45) Date of Patent: Jan. 29, 2008

(54) DATA COLLECTION SYSTEM

(75) Inventor: Satoshi Udou, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 255 days.

(21) Appl. No.: 10/544,916

(22) PCT Filed: May 11, 2004

(86) PCT No.: PCT/JP2004/006616

§ 371 (c)(1),
(2), (4) Date: Aug. 9, 2005

(87) PCT Pub. No.: WO2005/057861

PCT Pub. Date: Jun. 23, 2005

(65) Prior Publication Data

US 2006/0085571 A1    Apr. 20, 2006

(30) Foreign Application Priority Data

Dec. 12, 2003  (JP) .............................. 2003-415073

(51) Int. Cl.
G06F 3/00    (2006.01)
G06F 13/00   (2006.01)

(52) U.S. Cl. ......................................... 710/30; 710/33
(58) Field of Classification Search ............... 710/30, 710/33

See application file for complete search history.

(56) References Cited

U.S. PATENT DOCUMENTS 5,357,620 A * 10/1994 Suzuki ...................... 711/220
7,006,631 B1 * 2/2006 Luttrell et al. ............. 380/217
7,177,427 B1 * 2/2007 Komuro et al. ............ 380/239

FOREIGN PATENT DOCUMENTS

JP    10-320039 A   12/1998
JP    2000-174713 A  6/2000

OTHER PUBLICATIONS

CC-Link/LT Specification Ver. 1.00; translation of section 8.1.2.2; CC-Link Partner Association; undated.*
DeviceNet Communication Model and Communication Protocol; translation of sections 4.1,4.2,1.6.2, and 1.7; publisher ODVA; dated Mar. 31, 2002.*
CC-Link Specification Ver. 2.00; translation of section 8.1.2.2; CC-Link Partner Association; undated.*
J1SB3511 Standard OPCN-1 (Standard for the field network published from a government organization), unknown date.
EN50170 Standard PROFIBUS (Standard for the field network published from a government organization), Mar. 1998.
IEC62026-2 Standard AS-Interface (Standard for the sensor/actuator network published from a government organization), Jan. 31, 2002.

* cited by examiner

Primary Examiner—Glenn A. Auve
(74) Attorney, Agent, or Firm—Sughrue Mion, Pllc.

(57) ABSTRACT

A transfer apparatus transmits template information to each of a plurality of input/output units, wherein the template information indicates an area where an individual data relative to the input/output unit is to be stored in a data fragment. A target bit string including the individual data is generated in the input/output unit, based on the template information and an input state of the input/output unit, and is sent to the transfer apparatus. A bit string is created from the target bit strings, without performing bit shift operation, by performing logical operations on the target bit strings, and is transmitted to a controller.

1 Claim, 21 Drawing Sheets

FIG.5

```
/* PROCESSING OF TRANSFER APPARATUS 20 */
/* CONSTANT DEFINITION */
#define M 64         /* MAXIMUM NUMBER OF STATIONS IN FIELD NETWORK */
#define Q 3          /* NUMBER OF STATIONS IN SENSOR/ACTUATOR NETWORK */
#define D13_SIZE 2   /* SIZE (NUMBER OF BYTES) OF DATA IN TRANSMISSION FRAME 123m */
#define N_OF_50A 1   /* TOP STATION NUMBER IN INPUT/OUTPUT UNIT 50A */
#define N_OF_50B 2   /* TOP STATION NUMBER IN INPUT/OUTPUT UNIT 50B */
#define N_OF_50C 4   /* TOP STATION NUMBER IN INPUT/OUTPUT UNIT 50C */
#define SIZE_OF_50A 2  /* NUMBER OF OUTPUTS (2 BITS) FROM INPUT/OUTPUT UNIT 50A */
#define SIZE_OF_50B 4  /* NUMBER OF OUTPUTS (4 BITS) FROM INPUT/OUTPUT UNIT 50B */
#define SIZE_OF_50C 4  /* NUMBER OF OUTPUTS (4 BITS) FROM INPUT/OUTPUT UNIT 50C */
#define TRUE 0x01
#define FALSE 0x00

/* VARIABLE DEFINITION (SIZE OF unsigned int IS 8 BITS) */
unsigned int d13 [D13_SIZE] /* ARRAY FOR ACCESSING BIT STRING 13 RECEIVED BY TRANSFER APPARATUS 211 */
unsigned int p13 ;          /* VARIABLE USED FOR SPECIFYING ARGUMENT OF d13 */
unsigned int n50q[Q];       /* ARRAY VARIABLE FOR STORING STATION NUMBER OF INPUT/OUTPUT UNIT */
unsigned int p50q[M];       /* ARRAY VARIABLE USED FOR SPECIFYING ARGUMENT OF d50q */
unsigned int size50q[M];    /* ARRAY VARIABLE FOR STORING NUMBER OF OUTPUTS FROM INPUT/OUTPUT UNIT */
unsigned int flag_of_separate[M] ;/* ARRAY VARIABLE IN WHICH TRUE IS STORED WHEN DATA 14q SPANS OVER 2 BYTES */
unsigned int nsub;/* VARIABLE FOR STORING VALUE OBTAINED BY SUBTRACTING 1 FROM STATION NUMBER n OF INPUT/OUTPUT UNIT (1≦STATION NUMBER n≦ N)*/
unsigned int d14 [Q];       /* DATA FIELD OF FRAME RECEIVED FROM INPUT/OUTPUT UNIT */
unsigned int q;             /* TEMPORARY VARIABLE */
unsigned int d0,p0;         /* TEMPORARY VARIABLE */

/* INITIALIZATION OF VARIABLES */
n50q[0] = N_OF_50A - 1;
n50q[1] = N_OF_50B - 1;
n50q[2] = N_OF_50C - 1;
p50q[n50q[0]] = (2 * n50q[0]) % 8;
p50q[n50q[1]] = (2 * n50q[1]) % 8;
p50q[n50q[2]] = (2 * n50q[2]) % 8;
size50q[n50q[0]] = SIZE_OF_50A;
size50q[n50q[1]] = SIZE_OF_50B;
size50q[n50q[2]] = SIZE_OF_50C;
flag_of_separate[n50q[0]] = ((p50q[n50q[0]]==6) && (size50q[n50q[0]]==4))? TRUE : FALSE;
flag_of_separate[n50q[1]] = ((p50q[n50q[1]]==6) && (size50q[n50q[1]]==4))? TRUE : FALSE;
flag_of_separate[n50q[2]] = ((p50q[n50q[2]]==6) && (size50q[n50q[2]]==4))? TRUE : FALSE;

/* INITIALIZE VALUE OF BIT STRING 13 TO 0 */
for(p13=0; p13, =D13_SIZE; p13++)
   d13[p13] = 0x00;

/* FETCH VALUE OF BIT STRING 14q (DATA RECEIVED FROM INPUT/OUTPUT UNIT 50q) */
get_sensor_actuator_network_data( d14 );

/* STORE ALL BIT STRINGS 14q TOGETHER IN BIT STRING 13 */
p13 = 0;
for(q=0; q1=Q; q++){
   nsub = n50q[q];
   d0 = d14 [q];
   if(flag_of_separate[nsub]==FALSE) {
      d13[p13] |= d0;
      if(p50q[nsub] == 0x06)
         p13++;
   }else{
      d13[p13] |= d0 & 0xC0;
      p13++;
      d13[p13] = d0 & 0x03;
   }
}

/* TRANSMIT BIT STRING 13 TO CONTROLLER 10 */
set_field_network_data( d13 );
```

(block marked `d` brackets the for-loop body above)

FIG.6

| (A) /*PROCESSING OF TRANSFER APPARATUS 20*/ | (B) OPERATION OF MICROCOMPUTER | (C) REQUIRED NUMBER OF CLOCKS | |
|---|---|---|---|
| /*WHEN q=0*/ if(flag_of_separate[nsub]==FALSE){ | (1) STORE VALUE AT ADDRESS WHERE flag_of_separate[0] IS STORED IN REGISTER e | 1 | |
| | (2) STORE VALUE OF nsub IN REGISTER b | 1 | |
| | (3) ADD VALUE OF REGISTER b TO REGISTER e | 1 | |
| | (4) STORE DATA STORED AT ADDRESS INDICATED BY REGISTER e IN REGISTER a | 1 | |
| | (5) BRANCH TO (22) WHEN VALUE OF REGISTER a IS 0x00 | 1 | SUBTOTAL 5 CLOCKS 8% |
| d13 [p13] |= d0; | (6) STORE VALUE AT ADDRESS WHERE d13[0] IS STORED IN REGISTER e | 1 | |
| | (7) STORE VALUE OF p13 IN REGISTER b | 1 | |
| | (8) ADD VALUE OF REGISTER b TO REGISTER e | 1 | |
| | (9) STORE DATA STORED AT ADDRESS INDICATED BY REGISTER e IN REGISTER a | 1 | |
| | (10) STORE VALUE OF d0 IS STORED IN REGISTER b | 1 | |
| | (11) PERFORM OR OPERATION OF VALUE OF REGISTER b AND REGISTER a | 1 | SUBTOTAL 7 CLOCKS 12% |
| | (12) STORE VALUE OF REGISTER a AT ADDRESS INDICATED BY REGISTER e | 1 | |
| if(p50q[nsub] == 0x06) | (13) STORE VALUE AT ADDRESS WHERE p50q[0] IS STORED IN REGISTER e | 1 | |
| | (14) STORE VALUE OF nsub IN REGISTER b | 1 | |
| | (15) ADD VALUE OF REGISTER b TO REGISTER e | 1 | |
| | (16) STORE DATA STORED AT ADDRESS INDICATED BY REGISTER e IN REGISTER a | 1 | |
| | (17) BRANCH TO (21) WHEN VALUE OF REGISTER a IS DIFFERENT FROM 0x06 IN HEXADECIMAL NUMBER | 1 | SUBTOTAL 5 CLOCKS 8% |
| p13++; | (18) STORE VALUE OF p13 IN REGISTER a | 0 | |
| | (19) ADD 0x01 TO REGISTER a | 0 | |
| | (20) STORE VALUE OF REGISTER a IN p13 | 0 | SUBTOTAL 1 CLOCKS 2% |
| | (21) BRANCH TO SUBSEQUENT PROCESSING (PROCESSING SUBSEQUENT TO (40)) | 1 | |
| }else{ d13 [p13] |= d0 & 0xC0; | (22) STORE VALUE AT ADDRESS WHERE d13[0] IS STORED IN REGISTER e | 0 | |
| | (23) STORE VALUE OF p13 IN REGISTER b | 0 | |
| | (24) ADD VALUE OF REGISTER b TO REGISTER e | 0 | |
| | (25) STORE DATA STORED AT ADDRESS INDICATED BY REGISTER E IN REGISTER B | 0 | |
| | (26) STORE VALUE OF d0 IN REGISTER a | 0 | |
| | (27) PERFORM AND OPERATION OF REGISTER a AND 0xC0 IN HEXADECIMAL NUMBER | 0 | |
| | (28) PERFORM OR OPERATION OF REGISTER a AND REGISTER b | 0 | SUBTOTAL 0 CLOCKS 0% |
| | (29) STORE VALUE OF REGISTER a AT ADDRESS INDICATED BY REGISTER e | 0 | |
| p13++; | (30) STORE VALUE OF p13 IN REGISTER a | 0 | |
| | (31) ADD 0x01 TO REGISTER a | 0 | |
| | (32) STORE VALUE OF REGISTER a IN p13 | 0 | SUBTOTAL 0 CLOCKS 0% |
| d13 [p13] = d0 & 0x01; | (33) STORE VALUE AT ADDRESS WHERE d13[0] IS STORED IN REGISTER e | 0 | |
| | (34) STORE VALUE OF p13 IN REGISTER b | 0 | |
| | (35) ADD VALUE OF REGISTER b TO REGISTER e | 0 | |
| | (36) STORE DATA STORED AT ADDRESS INDICATED BY REGISTER e IN REGISTER b | 0 | |
| | (37) STORE VALUE OF d0 IN REGISTER a | 0 | |
| | (38) PERFORM AND OPERATION OF REGISTER a AND 0xC0 IN HEXADECIMAL NUMBER | 0 | |
| | (39) PERFORM OR OPERATION OF REGISTER a AND REGISTER b | 0 | SUBTOTAL 0 CLOCKS 0% |
| } | (40) STORE VALUE OF REGISTER a AT ADDRESS INDICATED BY REGISTER e | 0 | SUBTOTAL 5 CLOCKS 8% |
| /*WHEN q=1*/ if(flag_of_separate[nsub]){ d13 [p13] |= d0; if(p50q[nsub] == 0x06) p13++; }else{ d13 [p13] |= d0 & 0xC0; p13++; d13 [p13] = d0 & 0x01; } | (41) TO (45) EXECUTE (22) TO (40) WHEN DATA 14q SPANS OVER A PLURALITY OF BYTES | 5 | SUBTOTAL 7 CLOCKS 12% |
| | (46) TO (52) PERFORM OR OPERATION OF d13 AND DATA 14q | 7 | SUBTOTAL 5 CLOCKS 8% |
| | (53) TO (57) DETERMINE WHETHER DATA 14q IS LOWEST ORDER 2 BITS OF d13 | 5 | |
| | (58) TO (61) ADVANCE POINTER p13 BY ONE | 1 | SUBTOTAL 1 CLOCKS 0% |
| | (62) TO (80) DIVIDE DATA 14q INTO TWO AND STORE IT IN d13 | 0 | SUBTOTAL 1 CLOCKS 0% |
| /*WHEN q=2*/ if(flag_of_separate[nsub]){ d13 [p13] |= d0; if(p50q[nsub] == 0x06) p13++; }else{ d13 [p13] |= d0 & 0xC0; p13++; d13 [p13] = d0 & 0x01; } | (81) TO (85) EXECUTE (22) TO (40) WHEN DATA 14q SPANS OVER A PLURALITY OF BYTES | 5 | SUBTOTAL 5 CLOCKS 8% SUBTOTAL 0 CLOCKS 0% |
| | (85) TO (92) PERFORM OR OPERATION OF d13 AND DATA 14q | 0 | SUBTOTAL 0 CLOCKS 0% |
| | (13) TO (97) DETERMINE WHETHER DATA 14q IS LOWEST ORDER 2 BITS OF d13 | 0 | SUBTOTAL 0 CLOCKS 0% |
| | (98) TO (101) ADVANCE POINTER p13 BY ONE | 0 | |
| | (102) TO (120) DIVIDE DATA 14q INTO TWO AND STORE IT IN d13 | | SUBTOTAL 19 CLOCKS 32% |
| | | 8+3+5 | TOTAL 60 CLOCK CYCLES |

FIG.7

```
/* PROCESSING OF INPUT/OUTPUT UNIT 50q */
/* CONSTANT DEFINITION */
#define OFF   0x00
#define ON    0x01

/* VARIABLE DEFINITION */
unsigned int d54q0 ;  /* TEMPORARY VARIABLE FOR STORING INPUT 54q0 */
unsigned int d54q1 ;  /* TEMPORARY VARIABLE FOR STORING INPUT 54q1 */
unsigned int d54q2 ;  /* TEMPORARY VARIABLE FOR STORING INPUT 54q2 */
unsigned int d54q3 ;  /* TEMPORARY VARIABLE FOR STORING INPUT 54q3 */
unsigned int t55q0;   /* TEMPLATE STORAGE UNIT 55q0 */
unsigned int t55q1;   /* TEMPLATE STORAGE UNIT 55q1 */
unsigned int t55q2;   /* TEMPLATE STORAGE UNIT 55q2 */
unsigned int t55q3;   /* TEMPLATE STORAGE UNIT 55q3 */
unsigned int d52q;    /* DATA FRAGMENT STORAGE UNIT 52q */

/* IN THE CASE OF INPUT/OUTPUT UNIT 50A */
if(node_number==N50A) {
    t55q0 = 0x01;
    t55q1 = 0x02;
}
/* IN THE CASE OF INPUT/OUTPUT UNIT 50B */
if(node_number==N50B) {
    t55q0 = 0x04;
    t55q1 = 0x08;
    t55q2 = 0x10;
    t55q3 = 0x20;
}
/* IN THE CASE OF INPUT/OUTPUT UNIT 50C */
if(node_number==N50C) {
    t55q0 = 0x40;
    t55q1 = 0x80;
    t55q2 = 0x01;
    t55q3 = 0x02;
}

/* OBTAIN INPUT 54qk (k=0 TO 1 OR 3) */
d54q0 =get_port_status(0);  /* WHEN INPUT 54q0 IS ON, RETURN 0X01, AND WHEN OFF, RETURN 0X00 */
d54q1 =get_port_status(1);  /* WHEN INPUT 54q1 IS ON, RETURN 0X01, AND WHEN OFF, RETURN 0X00 */
d54q2 =get_port_status(2);  /* WHEN INPUT 54q2 IS ON, RETURN 0X01, AND WHEN OFF, RETURN 0X00 */
d54q3 =get_port_status(3);  /* WHEN INPUT 54q3 IS ON, RETURN 0X01, AND WHEN OFF, RETURN 0X00 */

/* INITIALIZE VALUE OF d52q */
d52q = 0x00;                                                                    ⎫
                                                                                ⎬ e
/* REFLECT STATE OF INPUT 54qk (k=0 TO 1 OR 3) TO d52q */                       ⎭
if(d54q0) d52q |= t55q0;
if(d54q1) d52q |= t55q1;
if(d54q2) d52q |= t55q2;
if(d54q3) d52q |= t55q3;

/* WRITE VALUE IN DATA FIELD OF TRANSMISSION FRAME 123m */
set_sensor_actuator_network_data( d52q );
```

FIG.8

| (A) | (B) | (C) |
|---|---|---|
| /* PROCESSING OF INPUT/OUTPUT UNIT 50q */ | OPERATION OF MICROCOMPUTER | REQUIRED NUMBER OF CLOCKS |
| /* INITIALIZE VALUE OF d52q */<br>d52q=0x00; | (1) STORE VALUE OF 0x00 IN d52q | 1  SUBTOTAL 1 CLOCK |
| /* INPUT TO d52q OR REFLECT STATE OF 54qk (k=0 TO 1 OR 3) TO d52q */<br>if(d 54 q0) d52q l= t 55 q0; | (2) STORE VALUE OF d54q0 IN REGISTER a<br>(3) BRANCH TO (8) WHEN VALUE OF REGISTER A IS 0x00<br>(4) STORE VALUE OF d52q IN REGISTER a<br>(5) STORE VALUE OF t55q0 IN REGISTER b<br>(6) PERFORM OR OPERATION OF VALUE OF REGISTER b AND REGISTER a<br>(7) STORE VALUE OF REGISTER a IN d52q | 1<br>1<br>1<br>1<br>1<br>1  SUBTOTAL 6 CLOCKS |
| if(d 54 q1) d52q l= t 55 q1; | (8) STORE VALUE OF d54q1 IN REGISTER a<br>(9) WHEN VALUE OF REGISTER a IS 0x00, BRANCH TO PROCESSING SUBSEQUENT TO (13)<br>(10) STORE VALUE OF d52q IN REGISTER a<br>(11) STORE VALUE OF t55q1 IN REGISTER b<br>(12) PERFORM OR OPERATION OF VALUE OF REGISTER b AND REGISTER a<br>(13) STORE VALUE OF REGISTER a IN d52q | 1<br>1<br>0<br>0<br>0<br>0  SUBTOTAL 2 CLOCKS<br>TOTAL 9 CLOCK CYCLES |

FIG.11

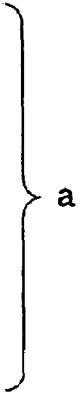

```
/* PROCESSING OF TRANSFER APPARATUS 121m */
/* CONSTANT DEFINITION */
#define N 64        /* MAXIMUM NUMBER OF STATIONS IN SENSOR/ACTUATOR NETWORK */
#define D123M_SIZE 16    /* SIZE (NUMBER OF BYTES) OF DATA IN TRANSMISSION FRAME 123m */

/* VARIABLE DEFINITION (SIZE OF unsigned int IS 8 BITS) */
unsigned int d123m[D123M_SIZE];  /* DATA FIELD OF TRANSMISSION FRAME 123m */
unsigned int d123mn[N];   /* DATA FIELD OF TRANSMISSION FRAME 123mn */
unsigned int p123m;       /* VARIABLE USED FOR SPECIFYING ARGUMENT OF d123m */
                          /* VARIABLE FOR STORING VALUE OBTAINED BY SUBTRACTING 1 FROM STATION NUMBER n OF
unsigned int nsub;           INPUT/OUTPUT UNIT 122mn1 (1≦STATION NUMBER n≦N) */
unsigned int d0,d1,nsubr ;/* INTERMEDIATE VARIABLE USED FOR PROCESSING TO STORE d123mn[ ] TOGETHER */

/* FETCH VALUE OF DATA FIELD IN TRANSMISSION FRAME 123mn */
get_sensor_acutuator_network_data( d123mn );

/* STORE d123mn[ ] TOGETHER IN BIT STRING 113m(d123m) */
p123m = 0;
nsub=0;
do{
  nsubr = nsub % 4;
  if(nsubr == 0)
    d0 = d123mn[nsub];
  else {
    d1 = d123mn[nsub];
    d1 <<= (nsubr * 2);
    if(nsubr != 3)
      d0 |= d1;
    else{
      d123m[p123m] = d0 | d1;
      p123m++;
    }
  }
  nsub++;
}while(nsub != N);

/* TRANSMIT d123m TO CONTROLLER 110 */
set_field_network_data( d123m );
``` a

```
/* PROCESSING (1) OF INPUT/OUTPUT UNIT 122mn WHEN INPUT PORT IS ARRANGED AT SAME ADDRESS */

/* CONSTANT DEFINITION */
#define OFF  0
#define ON   1

/* VARIABLE DEFINITION */
unsigned int d123mn;   /* DATA FIELD (8 BITS) OF TRANSMISSION FRAME 123mn */
unsigneg int mnP;      /* VARIABLE FOR STORING INPUT STATE 125mnk OF PORT mnPK */

/* FETCH INPUT STATE OF PORT mnPk (k=0 TO 1) */
get_port_status(mnP);
d123mn = mnP & 0x03;

/* WRITE VALUE IN DATA FIELD OF TRANSMISSION FRAME 123mn */
set_sensor_actuator_network_data( d123mn );
```

FIG.14

```
/* PROCESSING (2) OF INPUT/OUTPUT UNIT 122mn  WHEN INPUT PORT IS ARRANGED AT DIFFERENT ADDRESS */

/* CONSTANT DEFINITION */
    #define OFF  0
    #define ON   1

/* VARIABLE DEFINITION */
    unsigned int d123mn;/* DATA FIELD (8 BITS) OF TRANSMISSION FRAME 123mn */
    unsigned int mnP0on=0x01;/* CONSTANT TO BE OR PROCESSED WITH d123m WHEN INPUT STATE OF mnP0 IS ON */
    unsigned int mnP1on=0x02;/* CONSTANT TO BE OR PROCESSED WITH d123m WHEN INPUT STATE OF mnP1 IS ON */
    unsigned int mnP0,mnP1; /* VARIABLE FOR STORING INPUT STATE 125mnk OF PORT mnPk */

/* FETCH INPUT STATE OF PORT mnPk (k=0 to 1) */
    mnP0 = get_port_status(0); /* FUNCTION FOR RETURNING 0x01 WHEN PORT mnP0 IS ON, AND 0x00 WHEN PORT mnP0 IS OFF */
    mnP1 = get_port_status(1); /* FUNCTION FOR RETURNING 0x01 WHEN PORT mnP1 IS ON, AND 0x00 WHEN PORT mnP0 IS OFF */
    d123mn=0x00;
    if(mnP0)  d123mnj= mnP0on;         ⎫
    if(mnP1)  d123mn|= mnP1on;         ⎬  b
                                       ⎭

/* WRITE VALUE IN DATA FIELD OF TRANSMISSION FRAME 123m */
    set_sensor_actuator_network_data( d123mn );
```

FIG.15

| (A) | (B) | (C) |
|---|---|---|
| /* PROCESSING OF INPUT/OUTPUT UNIT 122mn */ | OPERATION OF MICROCOMPUTER | REQUIRED NUMBER OF CLOCKS |
| //* FETCH INPUT STATE OF PORT mnPk (k=0 to 1) */ d123mn=0x00; | (1)STORE VALUE 0x00 IN d123mn | 1  SUBTOTAL 1 CLOCK |
| if(mnP0) d123mn |= mnP0on; | (2)STORE VALUE OF mnP0 IN REGISTER a<br>(3)BRANCH TO (8) WHEN VALUE OF REGISTER a IS 0x00<br>(4)STORE VALUE OF d123mn IN REGISTER a<br>(5)STORE VALUE OF mnP0on IN REGISTER b<br>(6)PERFORM OR OPERATION OF VALUE OF REGISTER b AND REGISTER a<br>(7)STORE VALUE OF REGISTER a IN d123mn | 1<br>1<br>1<br>1<br>1<br>1  SUBTOTAL 6 CLOCKS |
| if(mnP1) d123mn |= mnP1on; | (8)STORE VALUE OF mnP1 IN REGISTER a<br>(9)WHEN VALUE OF REGISTER a IS 0x00, BRANCH TO PROCESSING SUBSEQUENT TO (13)<br>(10)STORE VALUE OF d123mn IN REGISTER a<br>(11)STORE VALUE OF mnP1on IN REGISTER b<br>(12)PERFORM OR OPERATION OF VALUE OF REGISTER b AND REGISTER a<br>(13)STORE VALUE OF REGISTER a IS STORED IN d123mn | 1<br>1<br>0<br>0<br>0<br>0  SUBTOTAL 2 CLOCKS<br>TOTAL 9 CLOCK CYCLES |

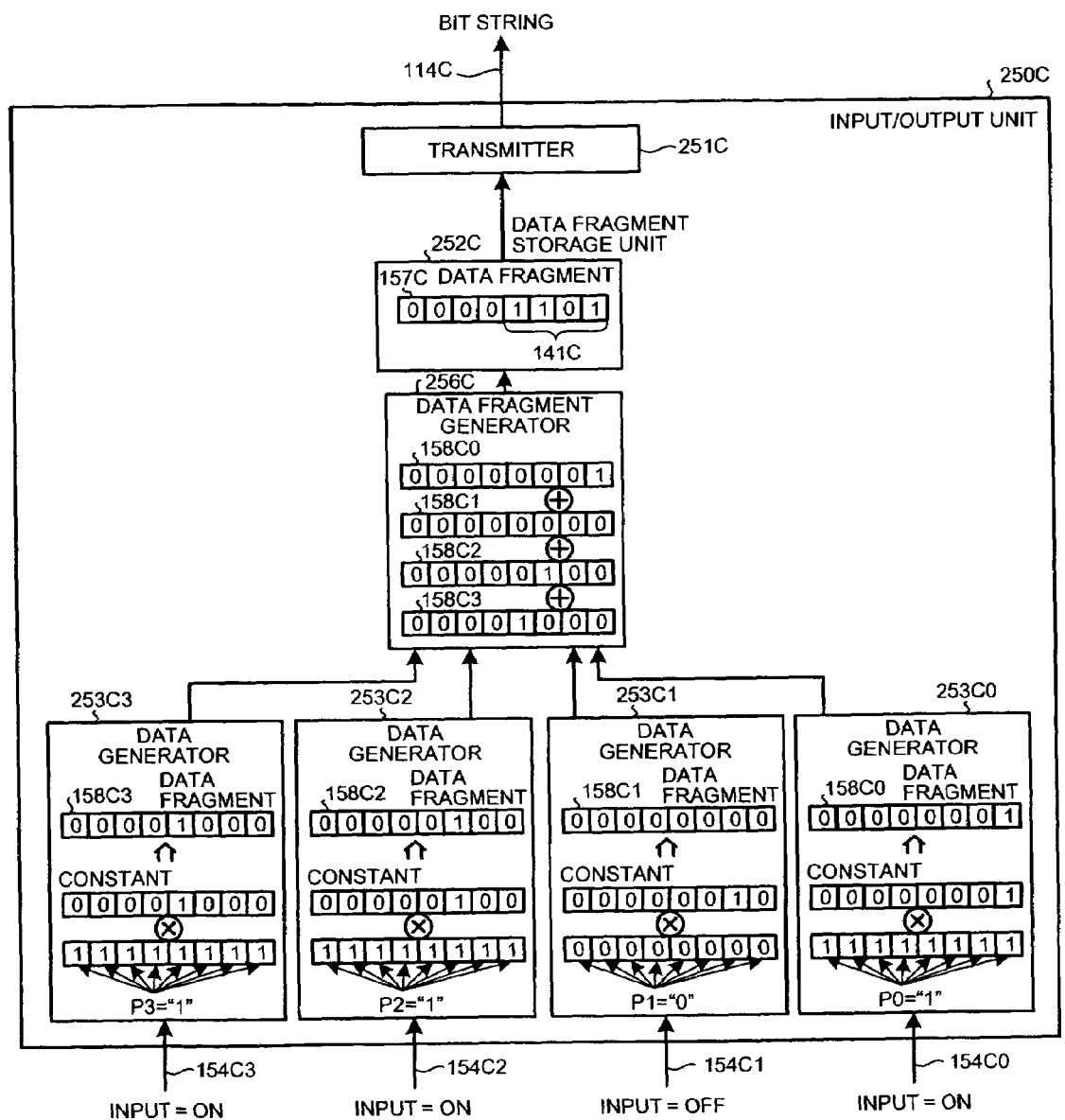

FIG.20

```
/* PROCESSING OF TRANSFER APPARATUS 211 */

/* CONSTANT DEFINITION */
#define M 64          /* MAXIMUM NUMBER OF STATIONS IN FIELD NETWORK */
#define Q 3           /* NUMBER OF STATIONS IN SENSOR/ACTUATOR NETWORK */
#define D113_SIZE 2   /* SIZE (NUMBER OF BYTES) OF DATA IN TRANSMISSION FRAME 123m */
#define N_OF_250A 1   /* TOP STATION NUMBER IN INPUT/OUTPUT UNIT 250A */
#define N_OF_250B 2   /* TOP STATION NUMBER IN INPUT/OUTPUT UNIT 250B */
#define N_OF_250C 4   /* TOP STATION NUMBER IN INPUT/OUTPUT UNIT 250C */
#define SIZE_OF_250A 2   /* NUMBER OF OUTPUTS (2 BITS) FROM INPUT/OUTPUT UNIT 250A */
#define SIZE_OF_250B 4   /* NUMBER OF OUTPUTS (4 BITS) FROM INPUT/OUTPUT UNIT 250B */
#define SIZE_OF_250C 4   /* NUMBER OF OUTPUTS (4 BITS) FROM INPUT/OUTPUT UNIT 250C */
#define TRUE 0x01
#define FALSE 0x00

/* VARIABLE DEFINITION (SIZE OF unsigned int IS 8 BITS) */
unsigned int d113[D113_SIZE];  /* ARRAY FOR ACCESSING BIT STRING 113 RECEIVED BY TRANSFER APPARATUS 211 */
unsigned int p113;             /* VARIABLE USED FOR SPECIFYING ARGUMENT OF d113 */
unsigned int n250q[Q];         /* ARRAY VARIABLE FOR STORING STATION NUMBER OF INPUT/OUTPUT UNIT */
unsigned int p250q[M];         /* ARRAY VARIABLE USED FOR SPECIFYING ARGUMENT OF d50q */
unsigned int size250q[M]       /* ARRAY VARIABLE FOR STORING NUMBER OF OUTPUTS FROM INPUT/OUTPUT UNIT */
unsigned int flag_of_separate[M];  /* ARRAY VARIABLE IN WHICH TRUE IS STORED WHEN DATA 141q SPANS OVER 2 BYTES */
unsigned int nsub;             /* VARIABLE FOR STORING VALUE OBTAINED BY SUBTRACTING 1 FROM STATION NUMBER n OF INPUT/OUTPUT UNIT (1≦STATION NUMBER n≦N) */
unsigned int d114[Q];          /* DATA FIELD OF FRAME RECEIVED FROM INPUT/OUTPUT UNIT */
unsigned int q;                /* TEMPORARY VARIABLE */
unsigned int d0,p0;            /* TEMPORARY VARIABLE */

/* INITIALIZATION OF VARIABLES */
n250q[0] = N_OF_250A- 1;
n250q[1] = N_OF_250B- 1;
n250q[2] = N_OF_250C- 1;
p250q[n250q[0]] = (2 * n250q[0]) % 8;
p250q[n250q[1]] = (2 * n250q[1]) % 8;
p250q[n250q[2]] = (2 * n250q[2]) % 8;
size250q[n250q[0]] = SIZE_OF_250A;
size250q[n250q[1]] = SIZE_OF_250B;
size250q[n250q[2]] = SIZE_OF_250C;
flag_of_separate[n250q[0]] = ((p250q[n250q[0]]==6) && (size250q[n250q[0]]==4))? TRUE : FALSE;
flag_of_separate[n250q[1]] = ((p250q[n250q[1]]==6) && (size250q[n250q[1]]==4))? TRUE : FALSE;
flag_of_separate[n250q[2]] = ((p250q[n250q[2]]==6) && (size250q[n250q[2]]==4))? TRUE : FALSE;

/* INITIALIZE VALUE OF BIT STRING 113 TO 0 */
for(p113=0; p113!=D113_SIZE; p113++)
    d113[p113] = 0x00;

/* FETCH VALUE OF BIT STRING 114q (DATA RECEIVED FROM INPUT/OUTPUT UNIT 250q) */
get_sensor_actuator_network_data( d114 );

/* STORE ALL BIT STRINGS 114q TOGETHER IN BIT STRING 113 */
p113 = 0;
for(q=0; q!=Q; q++){
    nsub = n250q [q];
    d0 = d114[q];
    p0 = p250q [nsub];
    d0 <<= p0;
    d113[p113] |= d0;
    if(p0 == 0x06)
        p113++;
    if(flag_of_separate[nsub]){
        d0 = d114[q];
        d0 >>= 2;
        d113[p113] = d0;
    }
}                                                } C /* TRANSMIT BIT STRING 113 TO CONTROLLER 110 */
set_field_network_data( d113 );
```

FIG.21

| (A) /*PROCESSING OF TRANSFER APPARATUS 211*/ | (B) OPERATION OF MICROCOMPUTER | (C) REQUIRED NUMBER OF CLOCKS | |
|---|---|---|---|
| /*WHEN q=0*/ | | | |
| p0 = p250q[nsub]; | (1) STORE VALUE AT ADDRESS WHERE p250q[0] IS STORED IN REGISTER a | 1 | |
| | (2) STORE VALUE OF nsub IN REGISTER b | 1 | |
| | (3) ADD VALUE OF REGISTER b TO REGISTER a | 1 | |
| | (4) STORE VALUE STORED AT ADDRESS INDICATED BY REGISTER a IN p0 | 1 | SUBTOTAL 4 CLOCKS 3% |
| | (5) STORE VALUE OF d0 IN REGISTER a | 1 | |
| d0 <<= p0; | (6) STORE VALUE OF p0 IN REGISTER c | 1 | |
| | (7) BRANCH TO (11) WHEN VALUE OF REGISTER c IS 0 | 1 | |
| | (8) SHIFT VALUE OF REGISTER a BY 1 BIT LEFTWARD | 0 | |
| | (9) SUBTRACT 1 FROM VALUE OF REGISTER c | 0 | |
| | (10) RETURN TO (7) | 0 | SUBTOTAL 4 CLOCKS 3% |
| | (11) STORE VALUE OF REGISTER a IN d0 | 1 | |
| d113[p113] \|= d0; | (12) STORE VALUE AT ADDRESS WHERE d113[0] IS STORED IN REGISTER a | 1 | |
| | (13) STORE VALUE OF p113 IN REGISTER b | 1 | |
| | (14) ADD VALUE OF REGISTER b TO REGISTER a | 1 | |
| | (15) STORE DATA STORED AT ADDRESS INDICATED BY REGISTER a IN REGISTER a | 1 | |
| | (16) STORE VALUE OF d0 IN REGISTER b | 1 | |
| | (17) PERFORM OR OPERATION OF VALUE OF REGISTER b AND REGISTER a | 1 | SUBTOTAL 7 CLOCKS 6% |
| | (18) STORE VALUE OF REGISTER a AT ADDRESS INDICATED BY REGISTER e | 1 | |
| if(p0 == 0x06) | (19) STORE VALUE OF p0 IN REGISTER a | 1 | |
| | (20) BRANCH TO (24) WHEN VALUE OF REGISTER a IS DIFFERENT FROM 0x06 | 1 | SUBTOTAL 2 CLOCKS 2% |
| p113++; | (21) STORE VALUE OF p113 IN REGISTER a | 0 | |
| | (22) ADD 1 TO REGISTER a | 0 | |
| | (23) STORE VALUE OF REGISTER a IN p113 | 0 | SUBTOTAL 0 CLOCKS 0% |
| if(flag_of_separate[nsub]){ | (24) STORE VALUE AT ADDRESS WHERE flag_of_separate[0] IS STORED IN REGISTER a | 1 | |
| | (25) STORE VALUE OF nsub IN REGISTER b | 1 | |
| | (26) ADD VALUE OF REGISTER b TO REGISTER a | 1 | |
| | (27) STORE DATA STORED AT ADDRESS INDICATED BY REGISTER a IN REGISTER a | 1 | |
| | (28) BRANCH TO PROCESSING SUBSEQUENT TO (40) WHEN VALUE OF REGISTER a IS 0x00 | 1 | SUBTOTAL 5 CLOCKS 4% |
| d0 = d114[q]; | (29) STORE VALUE AT ADDRESS WHERE d114[0] IS STORED IN REGISTER a | 0 | |
| | (30) STORE VALUE OF q IN REGISTER b | 0 | |
| | (31) ADD VALUE OF REGISTER b TO REGISTER a | 0 | |
| | (32) STORE DATA STORED AT ADDRESS INDICATED BY REGISTER a IN REGISTER a | 0 | |
| | (33) STORE VALUE OF REGISTER a IN d0 | 0 | SUBTOTAL 0 CLOCKS 0% |
| d0 >>= 1; | (34) SHIFT VALUE OF REGISTER a BY ONE BIT RIGHTWARD | 0 | |
| | (35) SHIFT VALUE OF REGISTER a BY ONE BIT RIGHTWARD | 0 | |
| | (36) STORE VALUE OF REGISTER a IN d0 | 0 | SUBTOTAL 0 CLOCKS 0% |
| d113[p113] = d0; | (37) STORE VALUE AT ADDRESS WHERE d113[0] IS STORED IN REGISTER a | 0 | |
| | (38) STORE VALUE OF p113 IN REGISTER b | 0 | |
| | (39) ADD VALUE OF REGISTER b TO REGISTER a | 0 | |
| | (40) STORE DATA STORED AT ADDRESS INDICATED BY REGISTER a IN REGISTER a | 0 | SUBTOTAL 0 CLOCKS 0% |
| } | | | |
| /*WHEN q=1*/ | (41) TO (44) OBTAIN NUMBER OF BITS TO BE SHIFTED | 4 | |
| p0 = p250q[nsub]; | (45) TO (51) PERFORM SHIFT PROCESSING OF BITS | 2(1+4×2)+1 | SUBTOTAL 4 CLOCKS 3% |
| d0 <<= p0; | (52) TO (58) SYNTHESIZE DATA OF 114q WITH d113 | 7 | SUBTOTAL 12 CLOCKS 10% |
| d113[p113] \|= d0; | (59) TO (60) DETERMINE FINISH OF DATA STORAGE TOGETHER WITH d113[p113]. | 2 | SUBTOTAL 7 CLOCKS 6% |
| if(p0 == 0x06) | FINISH WHEN p0==0x06. | 0 | SUBTOTAL 2 CLOCKS 2% |
| p113++; | | | SUBTOTAL 0 CLOCKS 0% |
| if(flag_of_separate[nsub]){ | (61) TO (63) SHIFT POINTER OF d113. PROCEED TO NEXT PROCESSING OF d113[p113]. | 5 | SUBTOTAL 5 CLOCKS 4% |
| d0 = d114[q]; | (64) TO (68) DETERMINE WHETHER THERE IS ANY DATA NOT YET SYNTHESIZED WITH 114q | 0 | SUBTOTAL 0 CLOCKS 0% |
| d0 >>= 1; | (69) TO (80) PERFORM PROCESSING IF THERE IS DATA NOT YET SYNTHESIZED WITH 114q | | |
| d113[p113] = d0; | | | |
| } | | | |
| /*WHEN q=2*/ | (81) TO (84) OBTAIN NUMBER OF BITS TO BE SHIFTED | 4 | |
| p0=p250q[nsub]; | (85) TO (91) PERFORM SHIFT PROCESSING OF BITS | 2(1+4×6)+1 | SUBTOTAL 4 CLOCKS 3% |
| d0 <<= p0; | (92) TO (98) SYNTHESIZE DATA OF 114q WITH d113 | 7 | SUBTOTAL 31 CLOCKS 27% |
| d113[p113] \|= d0; | (99) TO (100) DETERMINE FINISH OF DATA STORAGE TOGETHER WITH d113[p113]. | 2 | SUBTOTAL 7 CLOCKS 6% |
| if(p0 == 0x06) | FINISH WHEN p0==0x06. | 3 | SUBTOTAL 2 CLOCKS 2% |
| p113++; | | | SUBTOTAL 3 CLOCKS 3% |
| if(flag_of_separate[nsub]){ | (101) TO (103) SHIFT POINTER OF d113. PROCEED TO NEXT PROCESSING OF d113[p113]. | 5 | SUBTOTAL 5 CLOCKS 4% |
| d0 = d114[q]; | (104) TO (108) DETERMINE WHETHER THERE IS ANY DATA NOT SYNTHESIZED WITH 114q | 5+3+4 | SUBTOTAL 12 CLOCKS 10% |
| d0 >>= 1; | (109) TO (120) PERFORM PROCESSING IF THERE IS DATA NOT SYNTHESIZED WITH 114q | | TOTAL 116 CLOCK CYCLES |
| d113[p113] = d0; | | | |
| } | | | |

DATA COLLECTION SYSTEM

TECHNICAL FIELD

The present invention relates to a data collection system used in a field of control.

BACKGROUND ART

In the field of control, systems in which data is collected from one or more input/output units via a network, so that one controller can monitor the input state of the input/output units arranged at positions away from the controller by several to several hundreds of meters, and systems for distributing the control data to the input/output units via the network to-control the output state have been widely put into practical use.

Conventionally, the number of inputs and outputs per input/output unit (one unit is equal to one bit) ranges from 8 to 64. However, based on user demands, the number of inputs and outputs per input/output unit ranges from 1 to 8, in some recent input/output units. The network to be used is referred to as a field network for the former case, and as a sensor/actuator network for the latter case, due to the background of establishment in the market and a difference in the number of inputs and outputs of the input/output units. The sensor/actuator network. The outline is explained with reference to FIG. 9. In the specification, a network in which the number of inputs and outputs of the input/output unit is 8 or more is referred to as the field network, and a network in which the number of inputs and outputs of the input/output unit is less than 8 are referred to as the sensor/actuator network.

FIG. 9 is a conceptual diagram when the field network and the sensor/actuator network are hierarchical. In FIG. 9, a controller 110 is connected to a field network 111 having a length of from several tens to several thousands of meters, and m groups (m=1 to M) are connected to the field network 111. A transfer apparatus 121*m* connected to the field network 111 is arranged in the group m. A plurality of input/output units 122*mn* (n=1 to N) are connected to the transfer apparatus 121*m* via a sensor/actuator network 112*m* having a length of from several to several hundreds of meters. That is, the transfer apparatus 121*m* transmits to the controller 110, input state data received from the input/output units 122*mn* belonging to its own group, and also distributes control data received from the controller 110 to the input/output units 122*mn* of its own group.

A case that the controller collects data indicating the input state from one or more input/output units will be explained next, with reference to FIGS. 10 to 21. FIG. 10 is a diagram to explain data collection from the input/output unit in one group shown in FIG. 9. FIG. 10 is a diagram to explain a case that the input/output units 122*mn* in the group m creates a transmission frame 123*mn* including input state data to transmit the data to the sensor/actuator network 112*m*, and the transfer apparatus 121*m* in the group m creates a transmission frame 123*m* addressed to the controller 110 from the transmission frame. 123*mn* received from the sensor/actuator network 112*m*, to transmit the data to the field network 111.

The transmission frame 123*mn* is a bit string including a header field 71, a data field 72, and a check field 73. The transmission frame 123*m* is a bit string including a header field 75, a data field 76, and a check field 77. The configuration of such a transmission frame is generally used in serial communication, and the similar configuration is used in the Non-patent Literatures 1 to 6. The correspondence between the bit arrangement in the data field and the input/output ports of the input/output units is determined fixedly such that the least significant bit (LSB) represents the state of the 0-th input/output port.

The unit in the data field 76 in the transmission frame specified in the Non-patent Literatures 1, 2, and 5 is 1 byte. The unit in the data field 76 in the transmission frame specified in the Non-patent Literature 4 is 4 or 2 bytes. The unit in the data field 72 in the transmission frame specified in the Non-patent Literature 3 is 0.5 byte (4 bits are fixed). The unit in the data field 72 in the transmission frame specified in the Non-patent Literature 6 is 0.5 byte, 1 byte, or 2 bytes.

In FIG. 10, therefore, it is assumed that the unit in the data field 72 in the transmission frame 123*mn* to be transmitted to the sensor/actuator network 112*m* by the input/output unit 122*mn* is 1 byte. That is, the data field 72 in the transmission frame 123*mn* includes 8 bits of from bit b0 to bit b7. The first bit b0 on the header field 71 side is the least significant bit (LSB), and the eighth bit b7 on the check field 73 side is the most significant bit (MSB). The one-to-one correspondence between the bit position and the input/output port in the data field 72 is determined fixedly.

The unit in the data field 76 in the transmission frame 123*m* to be transmitted to the field network 111 by the transfer apparatus 121*m* is assumed to be 1 byte. A bit string 113*m* stored in the data field 76 includes 2×L bits (L is a multiple of 4), wherein the first bit on the header field 75 side is the least significant bit (LSB), and the last bit on the check field 77 side is the most significant bit (MSB). In FIG. 10, the input/output unit 122*mn* has two input ports mnP0 and mnP1, and hence, 2 bit data from the respective input/output units 122*mn* is stored in the data field 76. In other words, the first bit and the second bit are data from an input/output unit 122*m*1, and the third bit and the fourth bit are data from an input/output unit 122*m*2.

The input/output unit 122*mn* includes an input port mnPk to which an input 125*mnk* (in the example, k=0, 1) is connected, a storage unit that stores a data fragment 126*mn* indicating the state of the input port mnpk, and a transmitter 127*mn* that stores the data fragment 126*mn* in the data field 72 in the transmission frame 123*mn*, and transmits the data to the sensor/actuator network 112*m*. In the data fragment 126*mn*, a value ("0" or "1") of the input port mnP0 is stored in the bit b0, and a value of the input port mnP1 is stored in the bit b1. Because there is no corresponding input port in the bits b2 to b7, a value 0 is stored.

In the input/output unit 122*mn*, the input port mnPk monitors the input state of the input 125*mnk* (k=0, 1). The input port mnPk outputs a value 1 to the data fragment 126*mn* when the input state of the input 125*mnk* is ON, and outputs a value 0 to the data fragment 126*mn* when the input state of the input 125*mnk* is OFF. In the example shown in the figure, the input state of the input 125*mn*0 is ON, and the input state of the input 125*mn*1 is OFF. Therefore, "10000000" is stored in the bits b0 to b7 of the data fragment 126*mn*. The transmitter 127*mn* stores the data fragment 126*mn* in the data field 72 in the transmission frame 123*mn*, and transmits the data to the transfer apparatus 121*m*.

The transfer apparatus 121*m* receives the transmission frame 123*mn*, stores the data derived from the input port mnPk respectively stored in the data field 72 of the transmission frame 123*mn* (n=1 to N), in the (2×(m−1)+1)th bit to the (2×m)th bit, respectively, to generate the transmission frame 123*m*, and transmits the transmission frame 123*m* to the controller 110.

The processing content for creating the transmission frame 123m addressed to the controller 110 from the transmission frame 123mn received by the transfer apparatus 121m from the input/output units 122mn will be specifically explained with reference to FIGS. 11 and 12. FIG. 11 illustrates a process in which the transfer apparatus 121m uses an 8-bit microcomputer to extract, from the transmission frame 123mn, the respective data of 64 (the number of stations N=64) input/output units 122mn having 2 as the number of inputs, and embeds the respective data in corresponding bit positions in the bit string 113m of the transmission frame 123m. FIG. 12 is a diagram for specifically explaining the processing content related to part "a" shown in FIG. 11.

In FIG. 11, the transfer apparatus 121m defines constants in a constant defining section, declares variables in a variable defining section, and obtains the value in the data field 72 in the transmission frame 123mn according to a function get_sensor_actuator_network_data( ) into an array variable d123mn. The value of an array variable d123mn[0], which has stored the data from an input port 125m1k (k=0, 1) of the input/output unit 122m1 having a station number 1, is stored in a variable d0. Further, the value of an array variable d123mn[1], which has stored the data from an input port 125m2k (k=0, 1) of the input/output unit 122m2 having a station number 2, is stored in a variable d1. The value of the variable d1 is shifted by 2 bits leftward based on the station number n=2, to perform OR operation of the variable d1 and the variable d0. The value of an array variable d123mn[2], which has stored the data from an input port 125m3k (k=0, 1) of an input/output unit 122m3 having a station number 3, is then stored in the variable d1, and the value of the variable d1 is shifted by 4 bits leftward based on the station number n=3, to perform OR operation of the variable d1 and the variable d0.

The value of an array variable d123mn[3], which has stored data from an input port 125m4k of an input/output unit 122m4 having a station number 4, is stored in the variable d1, and after shifting the value of the variable d1 by 6 bits leftward based on the station number n=4, the logical sum of the variable d1 and the variable d0 is stored in an array variable d123m. Likewise, processing is performed for storing data d123mn[nsub] (nsub=i+0 to i+3, i is a multiple of 4) for four stations together in d123m[i] until i becomes N−4, to finish generation of data d123m, and the data stored in the array variable d123m is transmitted to the controller 110 according to a function set_field_network_data ( ).

In FIG. 12, the processing for the part "a" shown in FIG. 11 is shown in column (A), a processing operation actually performed by a microcomputer is shown in column (B), and the required number of clock cycles is shown in column (C). As shown in column (C), as for the number of clock cycles required when the microcomputer executes a command, if one clock cycles is required for one command, and when the data of 64 input/output units is stored together, a total of 2240 clock cycles are required for the processing of 16 lines in part "a" shown in FIG. 11, and 976 clock cycles, which is about 44% of 2240 clock cycles, are required for the bit shift processing.

A process in which the input/output unit 122mn determines the data fragment 126mn from the input 125mnk will be explained specifically with reference to FIGS. 13 to 15. FIGS. 13 and 14 illustrate a process in which the input/output unit 122mn uses an 8-bit microcomputer to determine the data fragment 126mn from the input 125mnk. FIG. 13 is a diagram to explain an instance in which the input port has the same address, and FIG. 14 is a diagram to explain an instance in which the input port has a different address. FIG. 15 is a diagram for explaining the details of a process related to part "b" shown in FIG. 14.

In FIG. 13, the input/output unit 122mn defines constants in a constant defining section, declares variables in a variable defining section, and then the input 125mnk is fetched from the input port mnPk (k=0, 1) into a variable mnP, which is just the data fragment 126mn according to a function get_port_status( ). An AND operation of the variable mnP and a constant 0x03 (03 in hexadecimal format) is performed so that bits other than the input port mnPk become 0, the result of the AND operation is stored in the variable d123mn, and also in the data fragment 126mn according to a function set_sensor_actuator_network_data( ).

In FIG. 14, the input/output unit 122mn defines constants in a constant defining section, declares variable in a variable defining section, and then the input 125mnk is fetched from the input port mnPk (k=0, 1) into a variable mnP0 and mnP1 respectively according to a function get port status( ). Then, if mnP0≠0 then an OR operation of variable 123mn, which is iust the data fragment 126mn, and variable mnP0on is performed, and if mnP1≠0 then an OR operation of variable 123mn and a variable mnP1on is performed. The result of the OR operations are stored in the variable d123mn according to set sensor actuator network data( ) to transmit the data to transfer apparatus 121m.

In FIG. 10, it is assumed that the input 125mn0 is ON, and the input 125mn1 is OFF. The details of the process in this case are shown in FIG. 15. In FIG. 15, the process in the part "b" shown in FIG. 14 is shown in column (A), a processing operation actually performed by a microcomputer is shown in column (B), and the required number of clock cycles is shown in column (C).

In column (B) in FIG. 15, at step (1), a value 0x00 (00 in hexadecimal number) is stored in the variable d123mn. At step (2), the value in the variable mnP0 derived from the input 125mn0 is stored in register a. In this example, because the input 125mn0 is ON, a value 0x01 is stored in the register a. At step (3), because the value of the register a is 0x01, control proceeds to step (4). At step (4), the value of the variable d123mn is stored in the register a. At step (5), the value 0x01 of the variable mnP0on is stored in register b. At step (6), OR operation of the values of the register b and the register a is performed, to change the value of the register a to 0x01. At step (7), the value of the register a is stored in the variable d123mn. In this example, the value 0x01 is stored in the variable d123mn. At step (8), the value in the variable mnP1 derived from the input 125mn1 is stored in the register a. In this example, because the input 125mn1 is OFF, the value 0x00 is stored in the register a. At step (9), because the value of the register a is 0x00, the processing for the part "b" shown in FIG. 14 finishes, and processing proceeds to a command subsequent to step (13), so that the value 0x01 of the variable d123mn is passed to the subsequent step.

As shown in column (C) in FIG. 15, as for the number of clock cycles required when the microcomputer executes the command, if one clock cycle is required for one command, a total of 9 clock cycles is required for the process of 3 lines in part "b" shown in FIG. 14.

FIG. 16 is a diagram for explaining a configuration of a conventional hierarchical data collection system and contents of the process executed by the transfer apparatus. FIG. 16 illustrates a system in which the controller 110 that controls the whole system collects input state data from three input/output units 250q (q=A, B, C) via a transfer apparatus 211, to monitor the state of an object to be controlled. The transfer apparatus 211 is connected to the controller 110 via the field network 111, and to the input/output units 250q via the sensor/actuator network 112. The configuration and contents of the process of the input/output units 250q shown in FIG. 16 are shown in FIGS. 17 to 19.

In FIG. 16, the transfer apparatus 211 includes a receiver 224 that receives a bit string 114q from three input/output units 250q (q=A, B, C) respectively, an operation unit 223 that receives the data fragment 132q from the receiver 224, a transmission buffer 222 that stores data fragments 228a and 228b generated by the operation unit 223 as a low-order data fragment 222a and a high-order data fragment 222b respectively, and a transmitter 221 that stores the low-order data fragment 222a and high-order data fragment 222b stored by the transmission buffer 222 in a bit string 113 and transmits the bit string 113 to the controller 110.

In FIG. 16, the bit string 113 includes 16 bits. The positions of the LSB and the MSB in the bit string 113 are displayed in the opposite direction to those shown in FIG. 10, and the LSB is at the right end. In the bit string 113, the first and the second bits on the lowest order side indicate the data 141A transmitted by the input/output unit 250q (q=A). The third to the sixth bits indicate the data 141B transmitted by the input/output unit 250q (q=B). The seventh to the tenth bits indicate the data 141C transmitted by the input/output unit 250q (q=C). The eleventh to the highest order sixteenth bit are not used.

The operation unit 223 stores a data fragment 132A received from the receiver 224 as a data fragment 131A in a register 223a. The operation unit 223 shifts the data fragment 132B received from the receiver 224 by 2 bits leftward, which is a direction toward the MSB, to obtain a data fragment 131B, and stores the data fragment 131B in a register 223c. The operation unit 223 provides a data fragment 132C received from the receiver 224 to two shift registers 223d and 223f. The shift register 223d shifts the data fragment 132C by 6 bits leftward to generate a data fragment 131Ca, and stores the data fragment 131Ca in a register 223e. On the other hand, the shift register 223f shifts the data fragment 132C by 2 bits rightward to generate a data fragment 131Cb, and designates the data fragment 131Cb as a data fragment 228b. OR operation of the data fragments stored in the registers 223a, 223c, and 223e is performed to generate a data fragment 228a.

The transmission buffer 222 stores the data fragment 228a as the low-order data fragment 222a, and the data fragment 228b as the high-order data fragment 222b. The transmitter 221 stores the low-order data fragment 222a and the high-order data fragment 222b in the bit string 113. In the bit string 113, therefore, 2-bit data 141A transmitted by the input/output unit 250q (q=A), 4-bit data 141B transmitted by the input/output unit 50q (q=B), and 4-bit data 141C transmitted by the input/output unit 50q (q=C) are arranged, without a gap, from the LSB toward the MSB.

As shown in FIGS. 17 to 19, the input/output unit 250q includes a data generator 253qk that generates a data fragment 158qk from an input 154qk (k=0 to 3), a data fragment generator 256q that generates a data fragment 157q from the data fragment 158qk, a data fragment storage unit 252q that stores the data fragment 157q, and a transmitter 251q that transmits the data fragment 157q as the bit string 114q to the transfer apparatus 211.

When the input 154qk is ON, the data generator 253qk sets a bit value in the (k+1)-th bit from the LSB in the data fragment 158qk to "1", and when the input 154qk is OFF, sets a bit value in the (k+1)-th bit from the LSB in the data fragment 158qk to "0". The data fragment generator 256q then performs OR operation of all the data fragments 158qk, having the same value of q, to generate the data fragment 157q.

An operation of the conventional data collection system having the above configuration will be explained. In the input/output unit 250A shown in FIG. 17, because an input 154A0 is ON, a data generator 253A0 generates data "11111111", in which all eight bits are "1", and performs AND operation of the data and an 8-bit constant "00000001" in which the first bit at the LSB is "1" and other bits are "0", to generate a data fragment 158A0 ("00000001") having an 8-bit length, in which the first bit at the LSB is "1" and other bits are "0".

Because an input 154A1 is OFF, a data generator 253A1 generates data "00000000", in which all eight bits are "0", and performs AND operation of the data and an 8-bit constant "00000010" in which the second bit from the LSB is "1" and other bits are "0", to generate a data fragment 158A1 ("00000000") having an 8-bit length, in which the second bit from the LSB is "0" and other bits are "0".

Next, a data fragment generator 256A performs OR operation of the data fragment 158A0 and the data fragment 158A1 to generate a data fragment 157A, which is "00000001", and stores the data fragment 157A in a data fragment storage unit 252A. A transmitter 251A selects the data fragment 157A from the data fragment storage unit 252A, and transmits it as a bit string 114A to the transfer apparatus 211. The lower-order 2 bits of the bit string 114A is data 141A ("01") to be transmitted to the controller 110.

In the input/output unit 250B in FIG. 18, because an input 154B0 is ON, a data generator 253B0 generates data "11111111", in which all 8 bits are "1", and performs AND operation of the data and an 8-bit constant "00000001" in which the first bit at the LSB is "1" and other bits are "0", to generate a data fragment 158B0 ("00000001") having an 8-bit length, in which the first bit at the LSB is "1" and other bits are "0".

Because an input 154B1 is OFF, a data generator 253B1 generates data "00000000", in which all 8 bits are "0", and performs AND operation of the data and an 8-bit constant "00000010" in which the second bit from the LSB is "1" and other bits are "0", to generate a data fragment 158B1 ("00000000") having an 8-bit length, in which the second bit from the LSB is "0" and other bits are "0".

Because an input 154B2 is ON, a data generator 253B2 generates data "11111111", in which all 8 bits are "1", and performs AND operation of the data and an 8-bit constant "00000100" in which the third bit from the LSB is "1" and other bits are "0", to generate a data fragment 158B2 ("00000100") having an 8-bit length, in which the third bit from the LSB is "1" and other bits are "0".

Because an input 154B3 is ON, a data generator 253B3 generates data "11111111", in which all 8 bits are "1", and performs AND operation of the data and an 8-bit constant "00001000" in which the fourth bit from the LSB is "1" and other bits are "0", to generate a data fragment 158B3 ("00001000") having an 8-bit length, in which the fourth bit from the LSB is "1" and other bits are "0".

Further, a data fragment generator 256B performs OR operation of the data fragment 158B0, the data fragment 158B1, the data fragment 158B2, and the data fragment 158B3, generates a data fragment 157B, which is "00001101", and stores the data fragment 157B in a data fragment storage unit 252B. A transmitter 251B selects the data fragment 157B from the data fragment storage unit 252B, and transmits it as a bit string 114B to the transfer apparatus 211. The low-order 4 bits in the bit string 114B is the data 141B ("1101") to be transmitted to the controller 110.

In the input/output unit 250C in FIG. 19, because an input 154C0 is ON, a data generator 253C0 generates data "11111111", in which all 8 bits are "1", and performs AND operation of the data and an 8-bit constant "00000001" in which the first bit at the LSB is "1" and other bits are "0", to generate a data fragment 158C0 ("00000001") having an 8-bit length, in which the first bit at the LSB is "1" and other bits are "0".

Because an input 154C1 is OFF, a data generator 253C1 generates data "00000000", in which all 8 bits are "0", and performs AND operation of the data and an 8-bit constant "00000010" in which the second bit from the LSB is "1" and other bits are "0", to generate a data fragment 158C1 ("00000000") having an 8-bit length, in which the second bit from the LSB is "0" and other bits are "0".

Because an input 154C2 is ON, a data generator 253C2 generates data "11111111" in which all 8 bits are "1", and performs AND operation of the data and an 8-bit constant "00000100" in which the third bit from the LSB is "1" and other bits are "0", to generate a data fragment 158C2 ("00000100") having an 8-bit length, in which the third bit from the LSB is "1" and other bits are "0".

Because an input 154C3 is ON, a data generator 253C3 generates data "11111111", in which all 8 bits are "1", and performs AND operation of the data and an 8-bit constant "00001000" in which the fourth bit from the LSB is "1" and other bits are "0", to generate a data fragment 158C3 ("00001000") having an 8-bit length, in which the fourth bit from the LSB is "1" and other bits are "0".

Further, a data fragment generator 256C performs OR operation of the data fragment 158C0, the data fragment 158C1, the data fragment 158C2, and the data fragment 158C3 to generate a data fragment 157C, which is "00001101", and stores the data fragment 157C in a data fragment storage unit 252C. A transmitter 251C selects the data fragment 157C from the data fragment storage unit 252C, and transmits it as a bit string 114C to the transfer apparatus 211. The lower-order 4 bits of the bit string 114C is the data 141C ("1101") to be transmitted to the controller 110.

In FIG. 16, in the transfer apparatus 211, the receiver 224 transmits the received bit string 114A as the data fragment 132A, the received bit string 114B as the data fragment 132B, and the received bit string 114C as the data fragment 132C, to the operation unit 223. The data 141A ("01") included in the received data fragment 132A in the one-to-one correspondence in the low-order 8 bits in the bit string 113. Therefore, the operation unit 223 directly stores the data fragment 132A as the data fragment 131A in the register 223a.

Further, the data 141B ("1101") to be stored in the lower-order 8 bits in the string 113 included in the received data fragment 132B, but the bit positions are shifted by 2 bits. Therefore, the operation unit 223 provides the received data fragment 132B to a shift register 223b to shift the bit position by 2 bits leftward, and stores the obtained data fragment 131B, which is "00110100", in the register 223c.

On the other hand, because the data 141C ("1101") included in the received data fragment 132C spans a border between the high-order 8 bits and the low-order 8 bits in the bit string 113, the operation unit 223 provides the received data fragment 132C to the shift registers 223d and 223f, so that these bits are separated from each other and the bit positions are as required.

The shift register 223d shifts data "00001101" in the data fragment 132C by 6 bits leftward, and stores the obtained data fragment 131Ca, which is "01000000", in the register 223e. The shift register 223f shifts data "00001101" in the data fragment 132C by 2 bits rightward, and designates the obtained data fragment 131Cb, which is "00000011", as the data fragment 228b.

The operation unit 223 performs OR operation of the data fragment 131A stored in the register 223a, the data fragment 131B stored in the register 223c, and the data fragment 131Ca stored in the register 223e, to generate the data fragment 228a, which is "01110101", and stores the data fragment 228a in the transmission buffer 222 as the low-order data fragment 222a. Further, the operation unit 223 stores the data fragment 228b in the transmission buffer 222 as the high-order data fragment 222b. As a result, the transmitter 221 transmits the low-order data fragment 222a and the high-order data fragment 222b to the controller 110 as the continuous bit string 113.

The process in which the transfer apparatus 211 creates the bit string 113 from the bit string 114q (q=A to C) will be specifically explained with reference to FIGS. 20 and 21. FIG. 20 illustrates a case that the transfer apparatus 211 uses an 8-bit microcomputer to execute the process. FIG. 21 is a diagram to explain details of the process related to part "c" shown in FIG. 20.

In FIG. 20, the transfer apparatus 211 defines constants in a constants defining section, declares variables in a variable defining section, initializes the variables, and stores 0x00 in the array variable d113, and obtains the value of the bit string 114q in an array variable d114 according to a function get_sensor_actuator_network_data( ). The transfer apparatus 211 then stores the value of the array variable d114[0], in which the data from an input port 154Ak (k=0, 1) in the input/output unit 250A having a station number of 1 is stored, in a variable d0, and performs OR operation of the variable d0 and the variable d113[0]. Further, the transfer apparatus 211 stores the value of the array variable d114[1], in which the data from an input port 154Bk (k=0 to 3) in the input/output unit 250B having a station number of 2 is stored, in the variable d0, shifts the value of the variable d0 by 2 bits leftward, and performs OR operation of the variable d0 and the variable d113[0].

Further, the transfer apparatus 211 stores the value of the variable d114[2], in which the data from an input port 154Ck (k=0 to 3) in the input/output unit 250C having a station number of 4 is stored, in the variable d0. After shifting the value of the variable d0 by 6 bits leftward, the transfer apparatus 211 performs OR operation of the variable d0 and the variable d113[0]. Subsequently, the transfer apparatus 211 stores the value of the variable d114[2] in the variable d0, shifts the value of the variable d0 by 2 bits rightward, and stores the value of the variable d0 in the variable d113[1]. As a result, storage of data in the array variable d113 finishes, and the transfer apparatus 211 transmits the data stored in the array variable d113 to the controller 110 according to a function of set_field_network_data ( ).

In FIG. 21, the processing for part "c" shown in FIG. 20 is shown in column (A), the processing operation actually performed by the microcomputer is shown in column (B), and the required number of clock cycles is shown in column (C). In column (C), the number of clock cycles required for the microcomputer to execute the processing for one line is expressed as 1, the number of clock cycles for lines that are not executed as a result of condition decision is expressed as 0, and the number of clock cycles for lines to be executed is expressed as 1, and the total of number of clock cycles is shown in the lowermost line.

In column (B) in FIG. 21, from step (1) to step (4), a value 0x00 stored in a variable p250q[0] is stored in a variable p0. From step (5) to step (11), because the value of p0 is 0x00, shift operation is not performed with respect to the variable d0 in which a value 0x01 is stored. From step (12) to step (18), OR operation of the value of the variable d0 and the variable d113[0] is performed, to change the value of the variable d113[0] to 0x01. From step (19) to step (23), because the value of a variable p0 is not 0x06, the value of the variable p113 is not changed. From step (24) to step (28), because the value of a variable flag_of_separate[0] is 0x00, processing of in case of q=0 is finished, and control proceeds to processing of in case of q=0. From step (41) to step (44), the value 0x02 stored in the yariable p250q[1] is stored in the variable p0. From step (45) to step (51), because the value of the variable p0 is 0x02, a value 0x0D stored in the variable d0 is shifted leftward by 2 bits, to obtain a value 0x34 in the variable d0.

From step (52) to step (58), OR operation of the value of the variable d0 and the variable d113[0] is performed, to change the value of the variable d113[0] to 0x35. From step (59) to step (63), because the value of the variable p0 is not 0x06, the value of the variable p113 is not changed. From step (64) to step (68), because the value of the variable flag_of_separate[1] is 0x00, processing of in case of q=1 is finished, and control proceeds to processing of in case of q=2. From step (81) to step (84), the value 0x06 stored in the variable p250q[3] is stored in the variable p0. From step (85) to step (91), because the value of the variable p0 is 0x06, a value 0x0D of the variable d0 is shifted 6 bits leftward to obtain a value 0x40in the variable d0. From step (92) to step (98), OR operation of the value of the variable d0 and the variable d113[0] is performed, to change the value of the variable d113[0] to 0x75.

From step (99) to step (103), because the value of the variable p0 is 0x06, 1 is added to the value of the variable p113. From step (104) to step (120), because the value of the variable flag_of_separate[3] is not 0x00, the value of the variable d114[2] is stored in the variable d0. A result of shifting the value of the variable d0 by 2 bits rightward is stored in the variable d113[1], to change the value of the variable d113[1] to 0x03. As a result, the process for storing the bit string 141q in the array variable d113 is complete. According to the above processing, when the required number of clock cycles per command is 1 clock cycle, as shown in column (C) in FIG. 21, a total of 116 clock cycles is required for the processing of the part "c" shown in FIG. 20.

However, according to the conventional processing method, because the bit shift operation is required when the transfer apparatus transfers data to the controller, there is a problem in that it takes time to perform the process of creating a transmission frame to be transmitted to the controller.

Because the transfer apparatus collects data from all input/output units through the sensor/actuator network, the time required until the process for collecting data from all input/output units completes is calculated by multiplying the processing time for one unit by the number of input/output units. As a result, there is a problem in that a delay in the process by the shift process causes performance deterioration in the data collection process.

The present invention has been achieved in order to solve the above problems. It is an object of the present invention to provide a data collection system, which does not require the shift operation of bits by the transfer apparatus.

DISCLOSURE OF THE INVENTION

In the data collection system according to the present invention, one controller collects input states of one or more input units via a transfer apparatus. The transfer apparatus includes a unit that creates a bit string in which individual data are arranged in a predetermined sequence, only by a logical operation without performing a bit shift operation with respect to the individual data received from the one or more input units, and transmits the created bit data to the controller, a unit that transmits template information, which indicates the correspondence between a bit position in the bit string and the individual data, to a corresponding input unit. The input unit includes a unit that stores template information received from the transfer apparatus or derived from the station number of the input unit, and a unit that generates individual data to be transmitted to the transfer apparatus, based on an input state and the stored template information.

According to the present invention, because the shift operation of bits by the transfer apparatus is not required, a bit string to be transmitted to the controller can be created in short time. Thus, the present invention is suitable as a data collection system in which one controller collects data individually from one or more input units, and the processing efficiency of which is improved.

BRIEF DESCRIPTION OF THE DRAWINGS

FIG. 5 is a diagram to specifically explain contents of a process in which the transfer apparatus shown in FIG. 1 generates a bit string to be transmitted to a controller, based on a bit string received from the respective input/output units;

FIG. 6 is a diagram to explain details of a process related to part "d" shown in FIG. 5;

FIG. 7 is a diagram to specifically explain contents of a process in which the input/output unit shown in FIG. 1 determines a bit string to be transmitted to the transfer apparatus based on an input state;

FIG. 8 is a diagram to explain details of a process related to part "e" shown in FIG. 7;

FIG. 11 is a diagram to specifically explain a process in which the transfer apparatus shown in FIG. 10 generates a transmission frame addressed to the controller from the transmission frame received from the input/output units;

Figure 12:
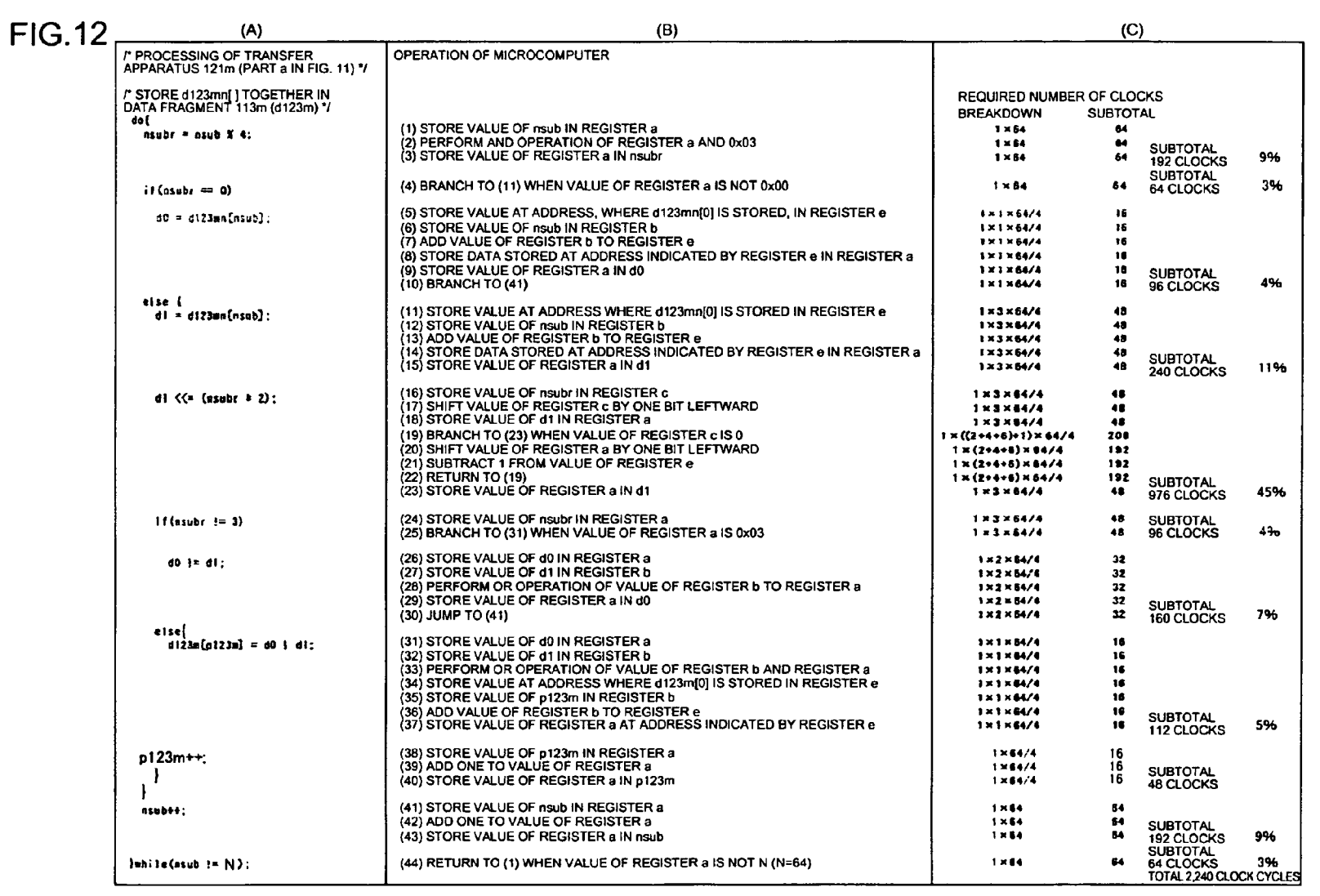

FIG. 12 is a diagram to specifically explain a process related to part "a" shown in FIG. 11;

FIG. 13 is a diagram to specifically explain a process in which the input/output unit shown in FIG. 10 determines a data fragment to be transmitted to the transfer apparatus from an input state (when an input port has the same address);

FIG. 14 is a diagram to specifically explain a process in which the input/output unit shown in FIG. 10 determines a data fragment to be transmitted to the transfer apparatus from the input state (when the input port has a different address);

FIG. 15 is a diagram to specifically explain a process related to part "b" shown in FIG. 14;

FIG. 19 is a diagram to explain a configuration and a process of still another input/output unit in the conventional data collection system shown in FIG. 16;

FIG. 20 is a diagram to specifically explain a process in which the transfer apparatus shown in FIG. 16 creates a bit string to be transmitted to a controller based on a bit string received from the respective input/output units; and FIG. 21 is a diagram to explain details of a process related to part "c" shown in FIG. 20.

BEST MODE FOR CARRYING OUT THE INVENTION

Exemplary embodiments of a data collection system according to the present invention will be explained in detail with reference to the accompanying drawings.

Figure 1:
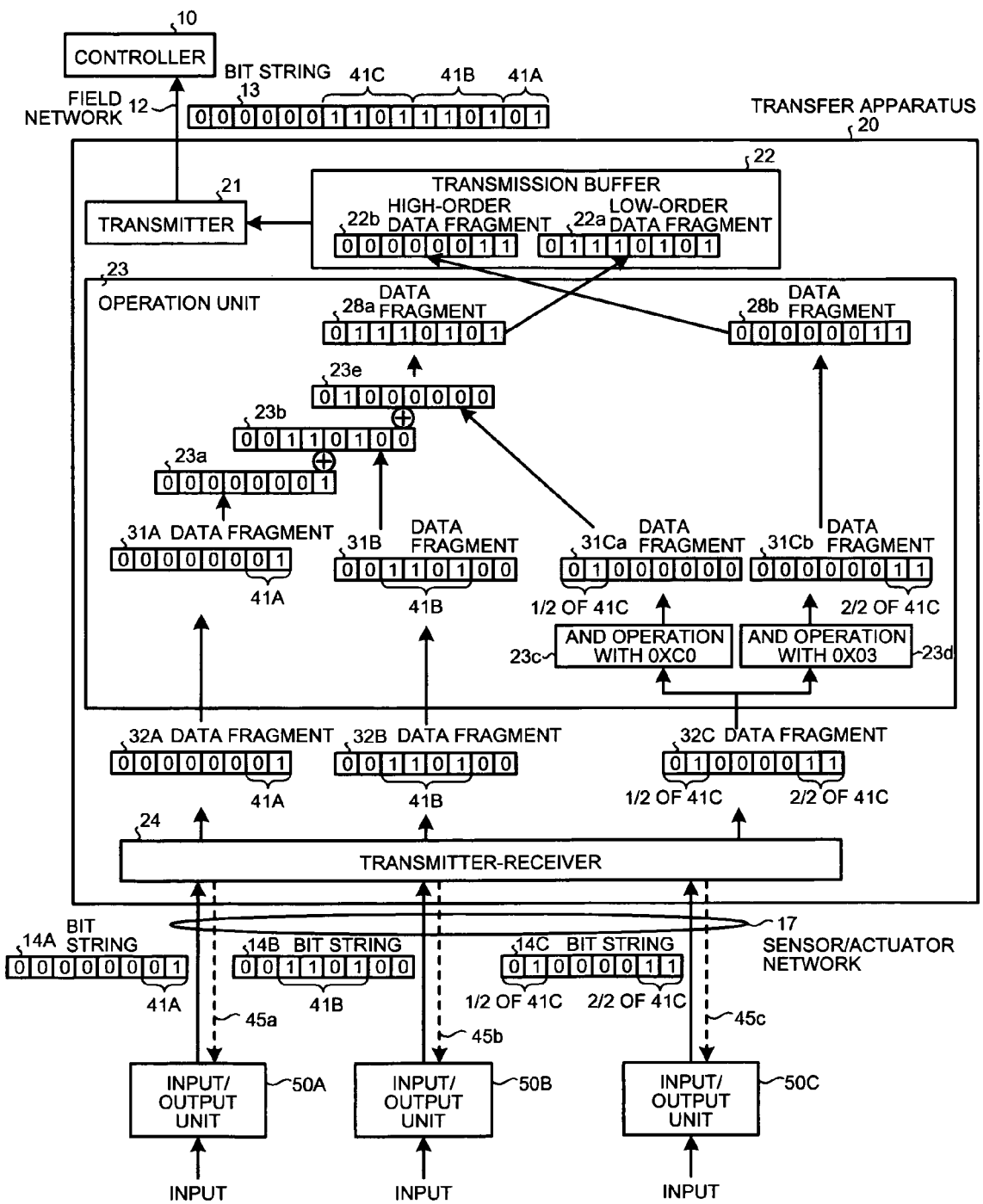
FIG. 1 is a diagram to explain a configuration of a data collection system and contents of a process of a transfer apparatus according to a first embodiment of the present invention.
Figure 2:
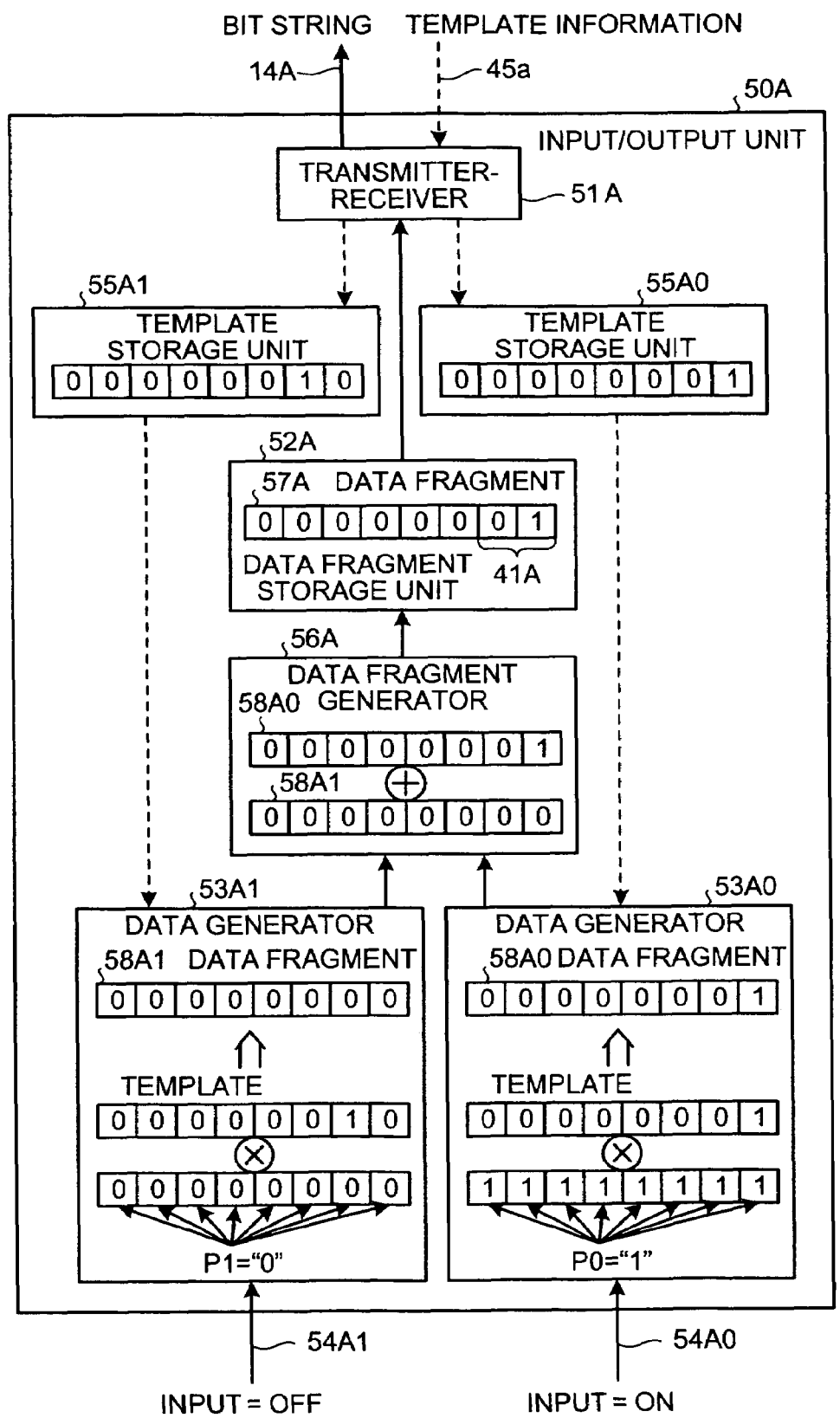
FIG. 2 is a diagram to explain a configuration and a process of an input/output unit shown in FIG. 1.
Figure 3:
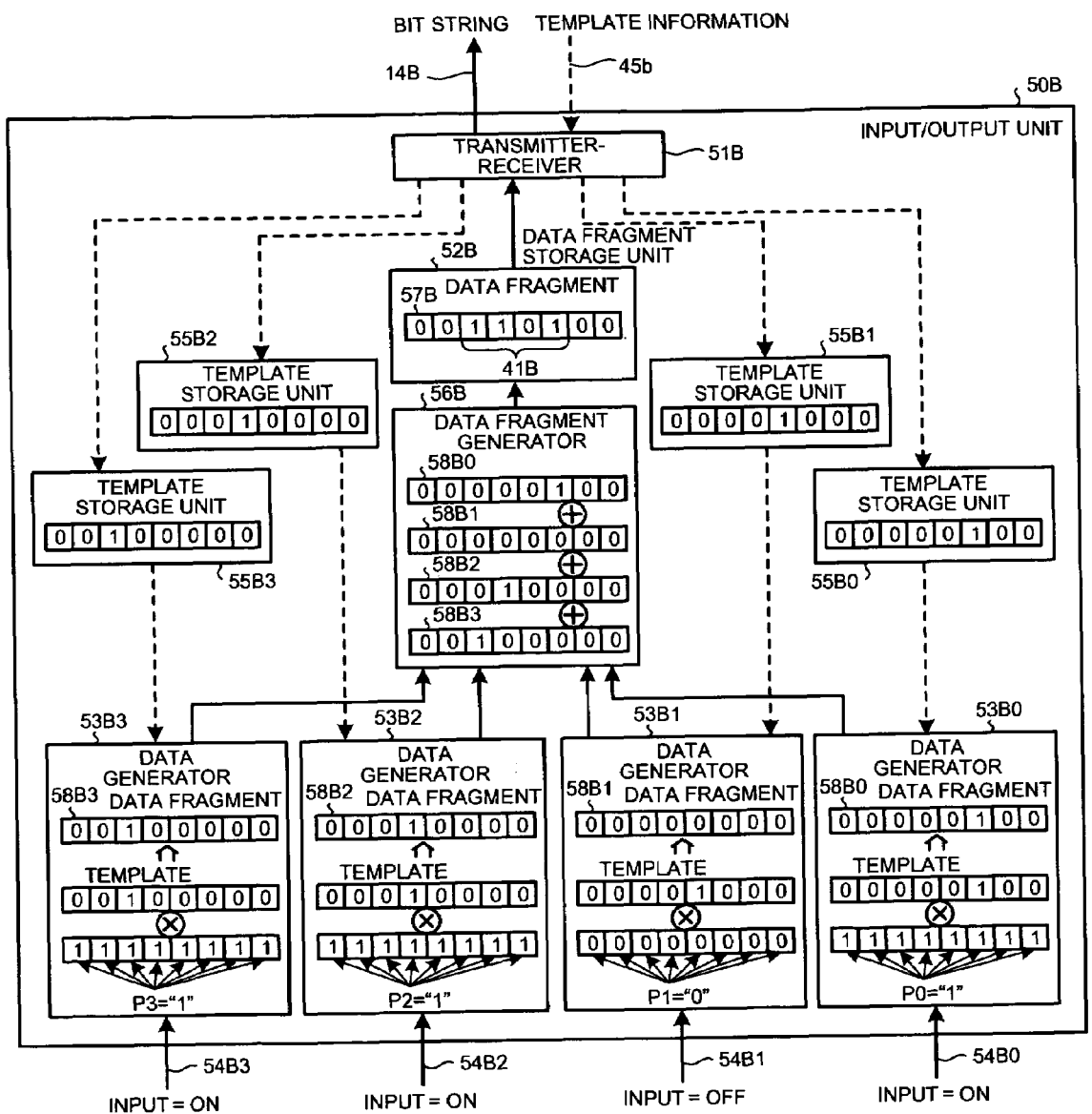
FIG. 3 is a diagram to explain a configuration and a process of another input/output unit shown in FIG. 1.
Figure 4:
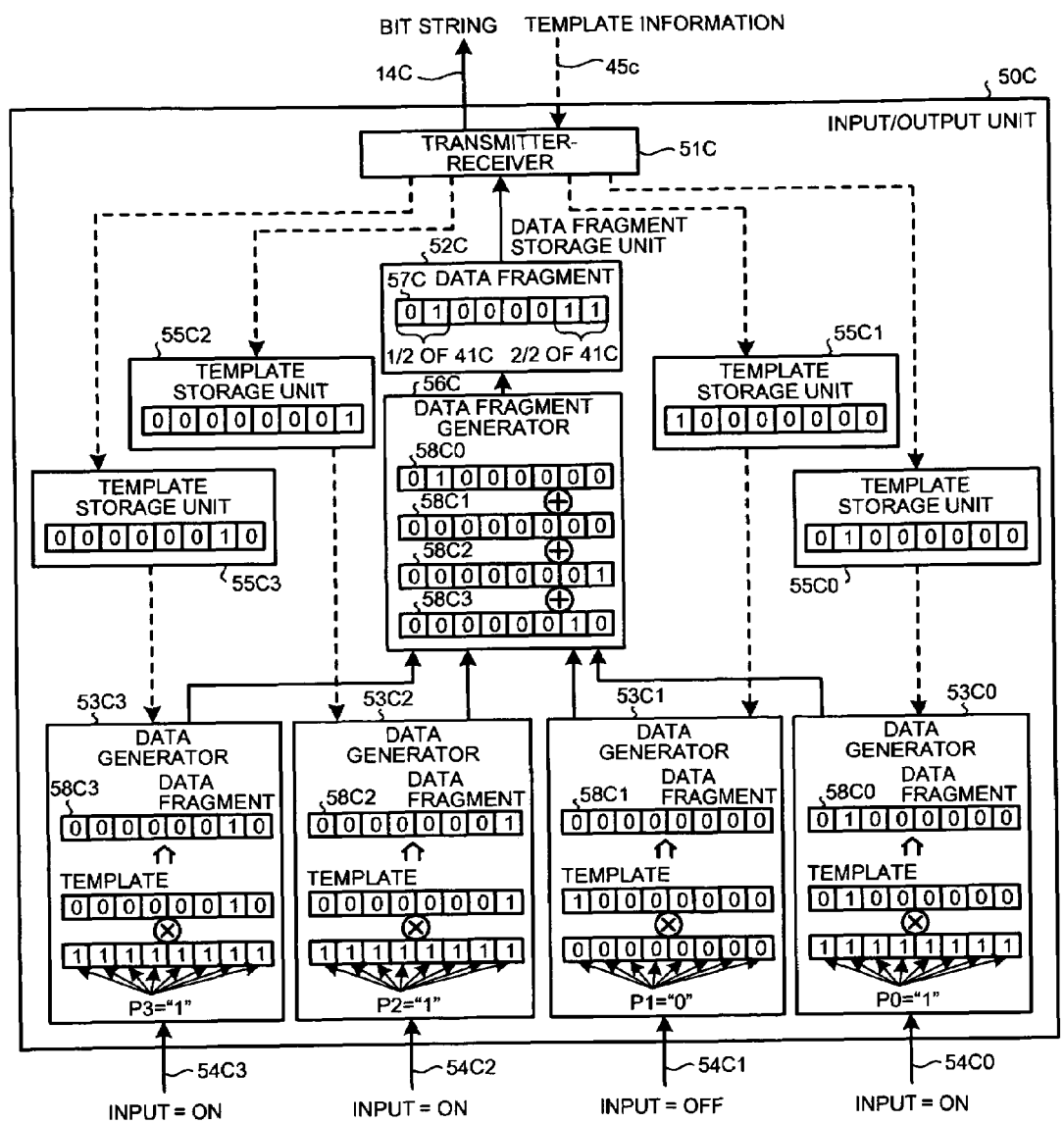
FIG. 4 is a diagram to explain a configuration and a process of still another input/output unit shown in FIG. 1.
Figure 9:
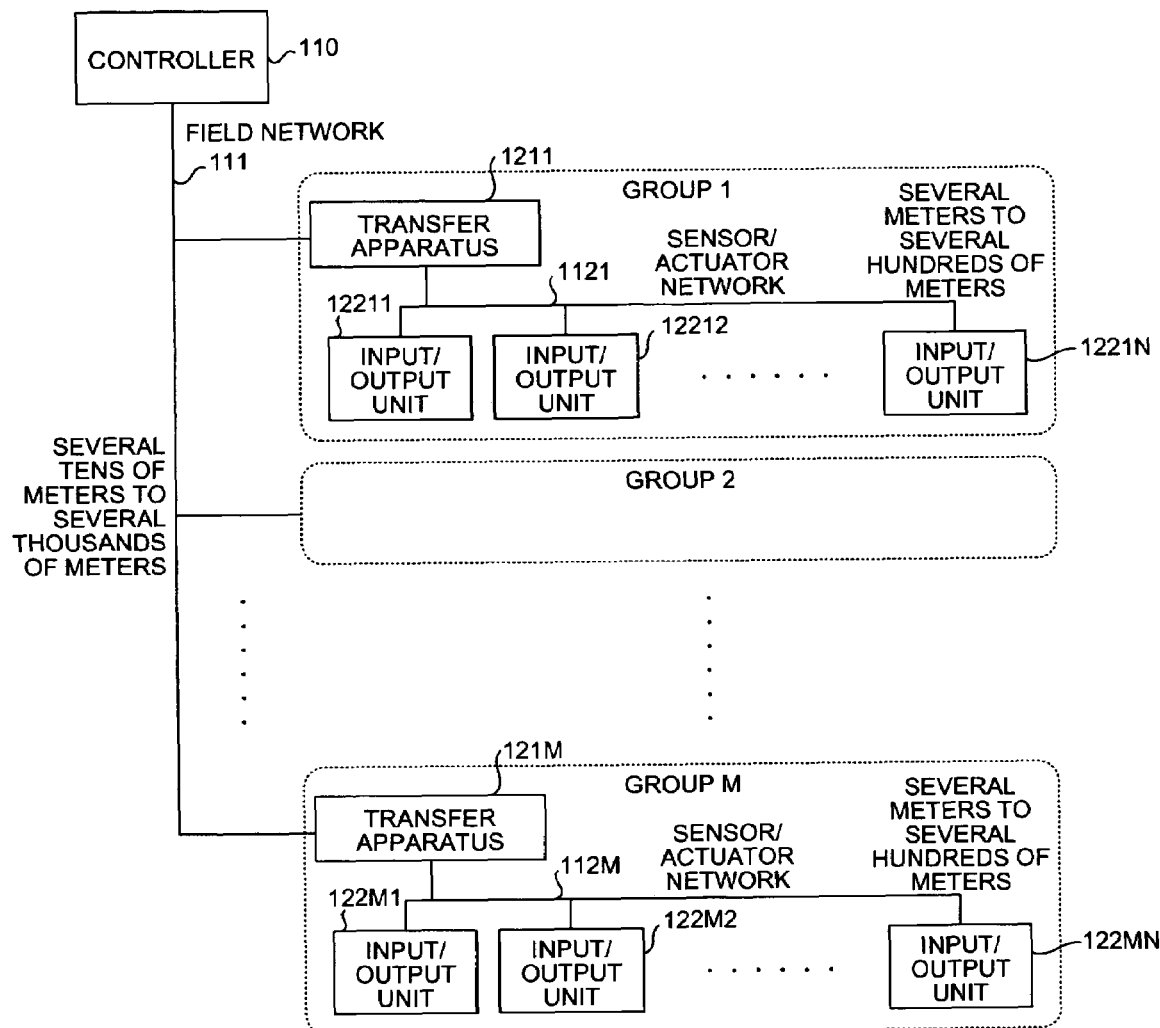
FIG. 9 is a conceptual diagram when a field network and a sensor/actuator network are hierarchical.
Figure 10:
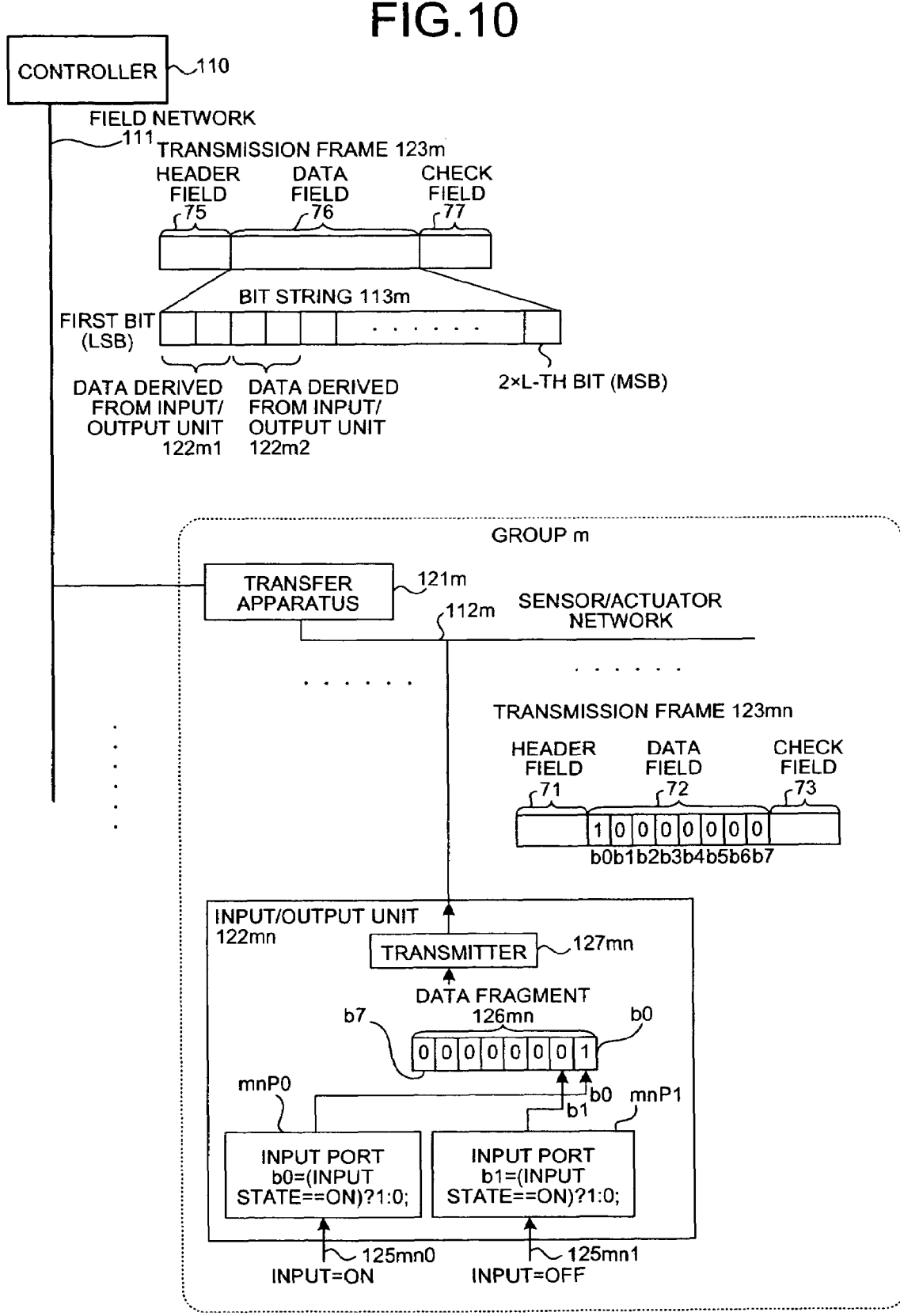
FIG. 10 is a diagram to explain data collection from the input/output unit in one group shown in FIG. 9.
Figure 16:
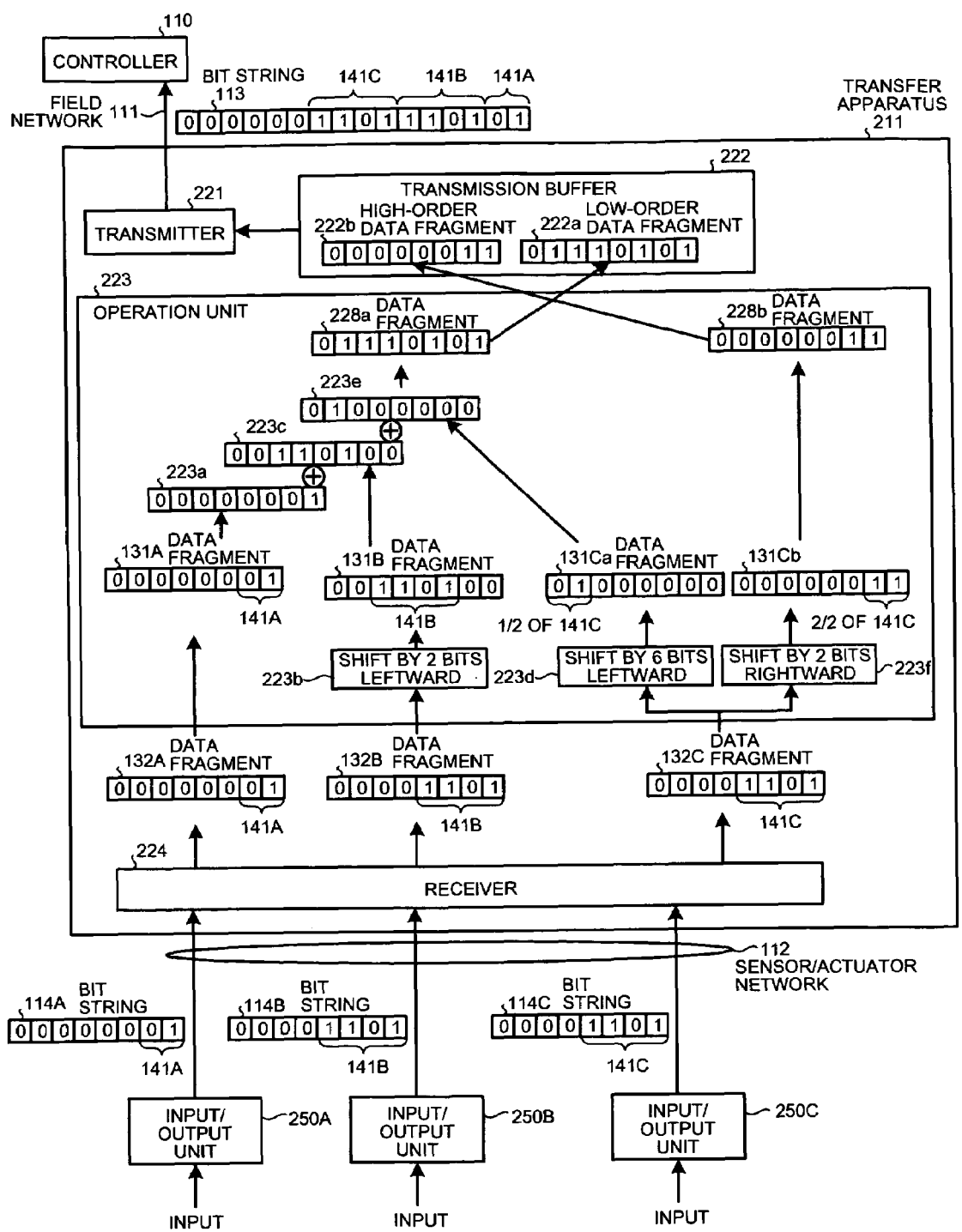
FIG. 16 is a diagram to explain a configuration of a conventional hierarchical data collection system and contents of a process executed by a transfer apparatus.
Figure 17:
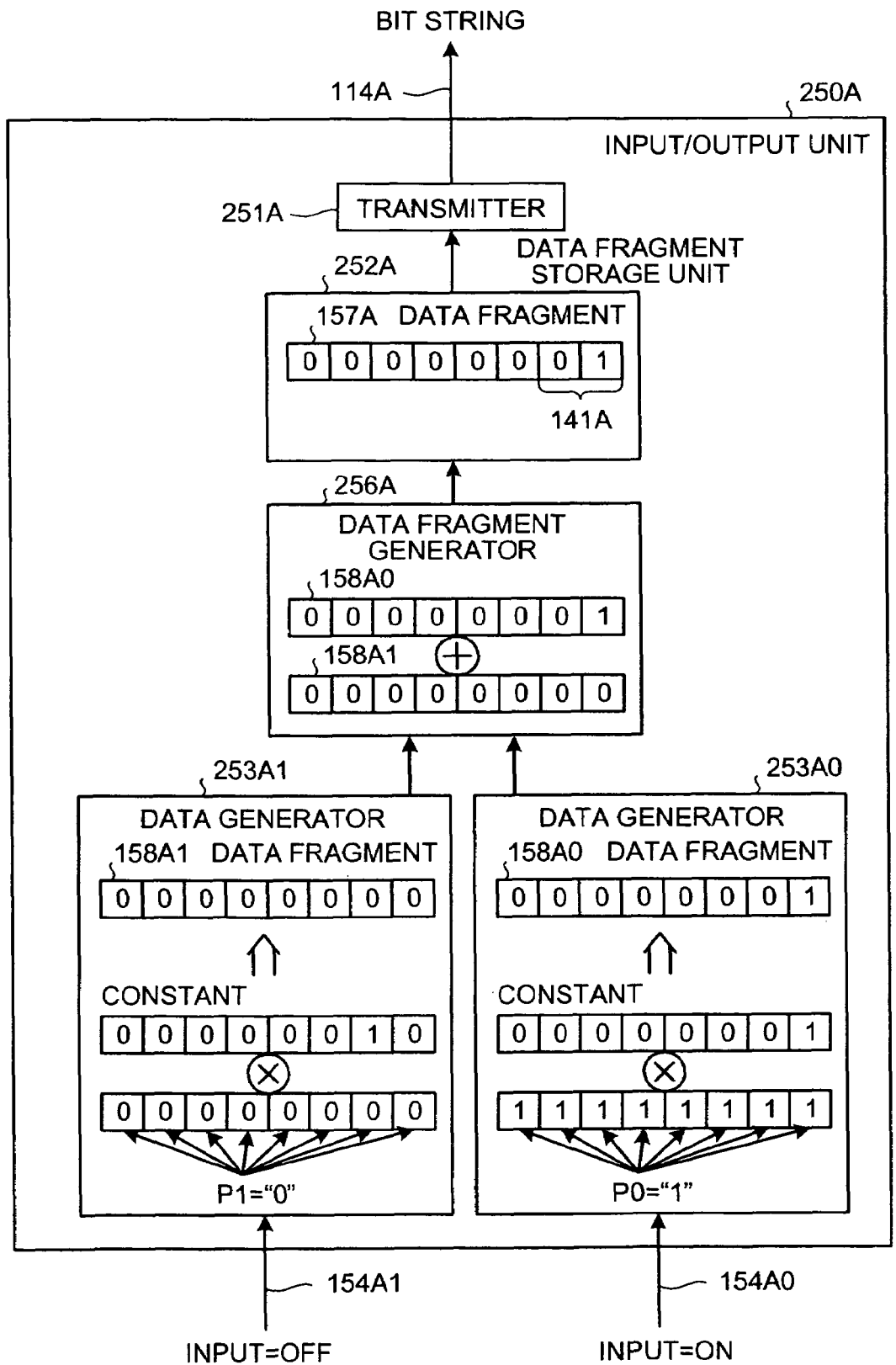
FIG. 17 is a diagram to explain the configuration and a process of an input/output unit in the conventional data collection system shown in FIG. 16.
Figure 18:
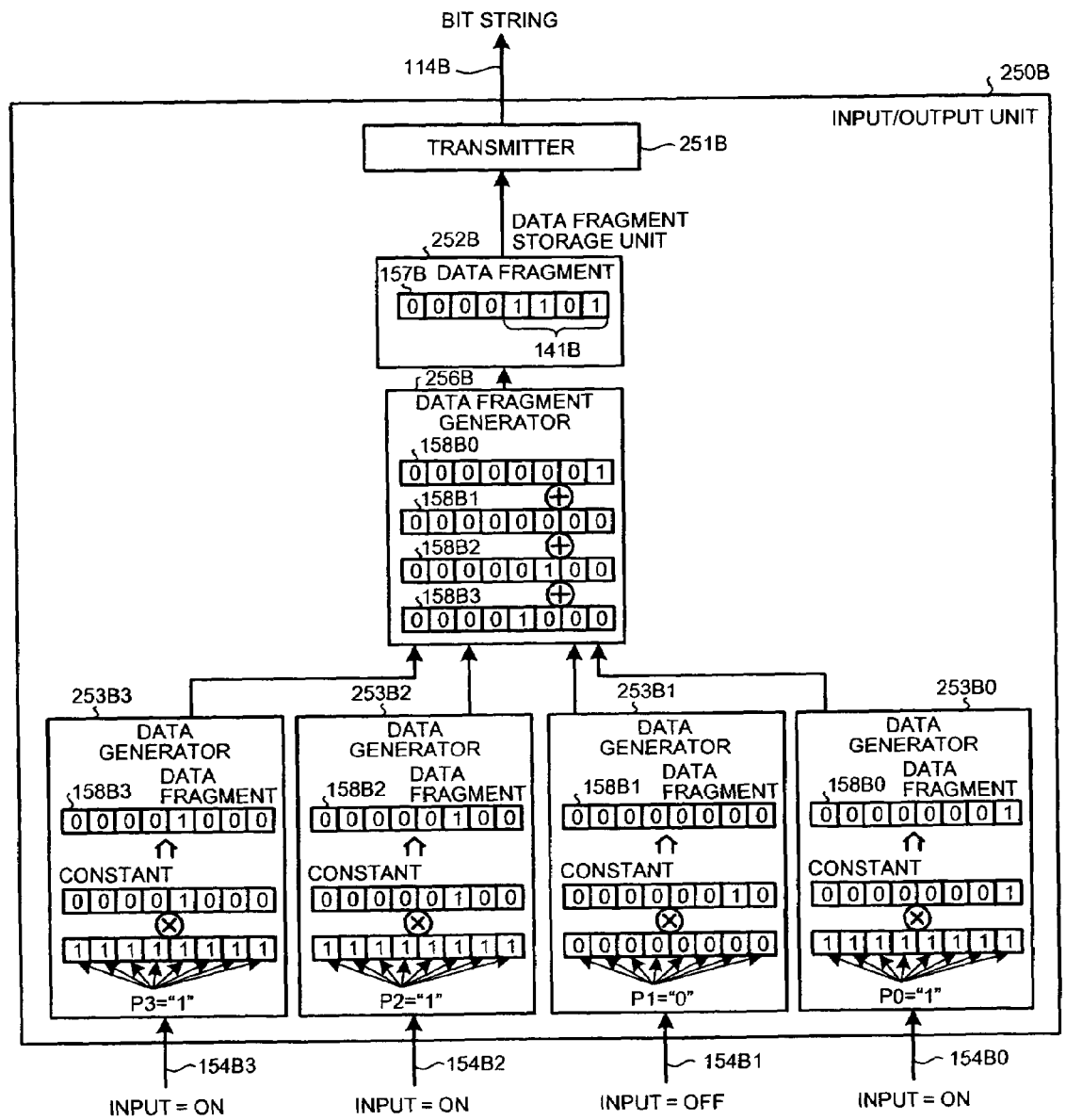
FIG. 18 is a diagram to explain a configuration and a process of another input/output unit in the conventional data collection system shown in FIG. 16.

FIG. 1 is a diagram to explain the configuration of a data collection system and a processing content of a transfer apparatus according to a first embodiment of the present invention. FIG. 1 illustrates a system in which a controller 10 that controls the whole system collects input state data from three input/output units 50$q$ (q=A, B, and C) via a transfer apparatus 20, to monitor the state of an object to be controlled. The transfer apparatus 20 is connected to the controller 10 via a field network 12, and to the input/output unit 50$q$ via a sensor/actuator network 17. The configuration and contents of the process of the input/output unit 50$q$ are shown in FIGS. 2 to 4.

In FIG. 1, the transfer apparatus 20 includes a transmitter-receiver 24 that transmits template information 45$a$, 45$b$, and 45$c$ to the three input/output units 50$q$ (q=A, B, C), and also receives a bit string 14$q$ from the three input/output units 50$q$, an operation unit 23 that receives a data fragment 32$q$ from the transmitter-receiver 24, a transmission buffer 22 that stores data fragments 28$a$ and 28$b$ generated by the operation unit 23 as a low-order data fragment 22$a$ and a high-order data fragment 22$b$ respectively, and a transmitter 21 that stores the low-order data fragment 22$a$ and the high-order data fragment 22$b$ stored by the transmission buffer 22 in a bit string 13, and transmits the data fragments to the controller 10.

In FIG. 1, the bit string 13 includes 16 bits. The position of the LSB in the bit string 13 is at the right end, and the position of the MSB is at the left end. The first bit and the second bit on the lowermost side indicate data 41A transmitted by the input/output unit 50$q$ (q=A). The third bit to the sixth bit are data 41B transmitted by the input/output unit 50$q$ (q=B). The seventh bit to the tenth bit are data 41C transmitted by the input/output unit 50$q$ (q=C). The eleventh bit to the sixteenth bit, which is the most significant bit, are not used.

In the operation unit 23, a data fragment 32A received from the transmitter-receiver 24 is stored as a data fragment 31A in a register 23$a$. A data fragment 32B received from the transmitter-receiver 24 is stored as a data fragment 31B in a register 23$b$. A data fragment 32C received from the transmitter-receiver 24 is sent to two AND circuits 23$c$ and 23$d$. In the AND circuit 23$c$, AND operation of the data fragment 32C and a hexadecimal value "C0" is performed to generate a data fragment 31Ca, which is stored in a register 23$e$. On the other hand, the AND circuit 23$d$ performs AND operation of the data fragment 32C and a hexadecimal value "03", to generate a data fragment 31Cb, which is designated as a data fragment 28$b$. Further, OR operation of the data fragments stored in the respective registers 23$a$, 23$b$, and 23$e$ is performed, to generate a data fragment 28$a$.

In the transmission buffer 22, the data fragment 28$a$ received from the operation unit 23 is stored as the low-order data fragment 22$a$, and the data fragment 28$b$ received from the operation unit 23 is stored as the high-order data fragment 22$b$. The transmitter 21 stores the low-order data fragment 22$a$ and the high-order data fragment 22$b$ stored by the transmission buffer 22 into the bit string 13. In the bit string 13, 2-bit data 41A transmitted by the input/output unit 50$q$ (q=A), 4-bit data 41B transmitted by the input/output unit 50$q$ (q=B), and 4-bit data 41C transmitted by the input/output unit 50$q$ (q=C) are arranged, without a gap, from the LSB toward the MSB.

Though a functional block is not shown, the transfer apparatus 20 generates information (template information 45$a$, 45$b$, and 45$c$) indicating the correspondence between a bit position in the bit string 13 and respective bit positions of the data 41A, 41B, and 41C collected from the input/output unit 50$q$, upon reception of an instruction from the controller 10, before starting the data collection operation, and transmits the information to the corresponding input/output unit 50$q$ via the transmitter-receiver 24.

As shown in FIGS. 2 to 4, the input/output unit 50$q$ includes a template storage unit 55$qk$ (k=0 to 3) that stores the template information, a data generator 53$qk$ that generates a data fragment 58$qk$ from an input 54$qk$, a data fragment generator 56$q$ that generates a data fragment 57$q$ from the data fragment 58$qk$, a data fragment storage unit 52$q$ that stores the data fragment 57$q$, and a transmitter-receiver 51$q$ that transmits the data fragment 57$q$ as the bit string 14$q$ to the transfer apparatus 20, and sends the template information received from the transfer apparatus 20 to the template storage unit 55$qk$.

When the input 54$qk$ is ON, the data generator 53$qk$ performs AND operation of data "11111111", in which all 8 bits are "1", and the template information stored in the template storage unit 55$qk$. When the input 54$qk$ is OFF, the data generator 53$qk$ performs AND operation of data "00000000", in which all 8 bits are "0", and the template information stored in the template storage unit 55$qk$, to generate a data fragment 58$qk$. The data fragment generator 56$q$ then performs OR operation of all data fragments 58$qk$, having the same q, to generate a data fragment 57$q$.

An operation of the data collection system according to the embodiment having the above configuration will be explained. In FIG. 1, the transfer apparatus 20 generates the template information 45$a$, 45$b$, and 45$c$ upon reception of an instruction from the controller 10 before starting the data collection process from the input/output units 50$q$, and transmits the template information to the respective input/ output unit 50q. The template information 45a includes information for an input 54A0 and an input 54A1 of an input/output unit 50A. The template information 45b includes information for an input 54B0, an input 54B1, an input 54B2, and an input 54B3 of an input/output unit 50B. The template information 45c includes information for an input 54C0, an input 54C1, an input 54C2, and an input 54C3 of an input/output unit 50C.

The template information includes 8 bits in the embodiment, and is generated by setting "1" at the bit position allocated to the input 54qk and "0" at other bit positions, taking into consideration the bit positions in the bit string 13.

Specifically, in the bit string 13, the data 41A is stored in the lowest order 2 bits of the low-order 8 bits. Therefore, the template information 45a includes an 8-bit template information "00000001" in which "1" is set in the first bit, and an 8-bit template information "00000010" in which "1" is set in the second bit.

The data 41B is stored in the intermediate 4 bits of the low-order 8 bits in the bit string 13. Therefore, the template information 45b includes an 8-bit template information "00000100" in which "1" is set in the third bit, an 8-bit template information "00001000" in which "1" is set in the fourth bit, an 8-bit template information "00010000" in which "1" is set in the fifth bit, and an 8-bit template information "00100000" in which "1" is set in the sixth bit.

The data 41C is stored in the highest order 2 bits of the low-order 8 bits in the bit string 13 and in the lowest order 2 bits of the high-order 8 bits. Therefore, the template information 45c includes an 8-bit template information "01000000" in which "1" is set in the seventh bit, an 8-bit template information "10000000" in which "1" is set in the eighth bit, an 8-bit template information "00000001" in which "1" is set in the first bit, and an 8-bit template information "00000010" in which "1" is set in the second bit.

Thus, in the input/output unit 50q, the template information is stored in the template storage unit 55qk. That is, when the input/output unit 50A shown in FIG. 2 receives the template information 45a, the template information "00000001" is stored in a template storage unit 55A0, and the template information "00000010" is stored in a template storage unit 55A1.

When the input/output unit 50B shown in FIG. 3 receives the template information 45b, the template information "00000100" is stored in a template storage unit 55B0, the template information "00001000" is stored in a template storage unit 55B1, the template information "00010000"0 is stored in a template storage unit 55B2, and the template information "00100000" is stored in a template storage unit 55B3.

When the input/output unit 50C shown in FIG. 4 receives the template information 45c, the template information "01000000" is stored in a template storage unit 55C0, the template information "10000000" is stored in a template storage unit 55C1, the template information "00000001" is stored in a template storage unit 55C2, and the template information "00000010" is stored in a template storage unit 55C3.

When these pieces of template information are stored in the above manner, the input/output unit 50q starts the process for transmitting the state of the input 54qk to the transfer apparatus 20. That is, in the input/output unit 50A shown in FIG. 2, because the input 54A0 is ON, a data generator 53A0 generates data "11111111", in which all 8 bits are "1", and generates a data fragment 58A0, which is "00000001", by performing AND operation of the data "11111111" and the template information "00000001" stored in the template storage unit 55A0. Because the input 54A1 is OFF, a data generator 53A1 generates data "00000000", in which all 8 bits are "0", and generates a data fragment 58A1, which is "00000000", by performing AND operation of the data "00000000" and the template information "00000010" stored in the template storage unit 55A1.

As a result, a data fragment generator 56A generates a data fragment 57A, which is "00000001", by performing OR operation of the data fragment 58A0 and the data fragment 58A1, and stores the data fragment 57A in a data fragment storage unit 52A. A transmitter-receiver 51A extracts the data fragment 57A from the data fragment storage unit 52A, and transmits it as a bit string 14A to the transfer apparatus 20. The lower-order 2 bits of the bit string 14A is the data 41A ("01") to be transmitted to the controller 10.

In the input/output unit 50B in FIG. 3, because the input 54B0 is ON, a data generator 53B0 generates data "11111111", in which all 8 bits are "1", and generates a data fragment 58B0, which is "00000100", by performing AND operation of the data "11111111" and the template information "00000100" stored in the template storage unit 55B0. Because the input 54B1 is OFF, a data generator 53B1 generates data "00000000", in which all 8 bits are "0", and generates a data fragment 58B1, which is "00000000", by performing AND operation of the data "00000000" and the template information "00001000" stored in the template storage unit 55B1. Because the input 54B2 is ON, a data generator 53B2 generates data "11111111", in which all 8 bits are "1", and generates a data fragment 58B2, which is "00010000", by performing AND operation of the data "11111111" and the template information "00010000 stored in the template storage unit 55B2. Because the input 54B3 is ON, a data generator 53B3 generates data "11111111", in which all 8 bits are "1", and generates a data fragment 58B3, which is "00100000", by performing AND operation of the data "11111111" and the template information "00100000" stored in the template storage unit 55B3.

As a result, a data fragment generator 56B generates a data fragment 57B, which is "00110100", by performing OR operation of the data fragment 58B0, the data fragment 58B1, the data fragment 58B2, and the data fragment 58B3, and stores the data fragment 57B in a data fragment storage unit 52B. A transmitter-receiver 51B selects the data fragment 57B from the data fragment storage unit 52B, and transmits it as a bit string 14B to the transfer apparatus 20. The intermediate 4 bits in the bit string 14B is the data 41B ("1101") to be transmitted to the controller 10.

In the input/output unit 50C in FIG. 4, because the input 54C0 is ON, a data generator 53C0 generates data "11111111", in which all 8 bits are "1", and generates a data fragment 58C0, which is "01000000", by performing AND operation of the data "11111111" and the template information "01000000" stored in the template storage unit 55C0. Because the input 54C1 is OFF, a data generator 53C1 generates data "00000000", in which all 8 bits are "0", and generates a data fragment 58C1, which is "00000000", by performing AND operation of the data "00000000" and the template information "10000000" stored in the template storage unit 55C1. Because the input 54C2 is ON, a data generator 53C2 generates data "11111111", in which all 8 bits are "1", and generates a data fragment 58C2, which is "00000001", by performing AND operation of the data "11111111" and the template information "00000001" stored in the template storage unit 55C2. Because the input 54C3 is ON, a data generator 53C3 generates data "11111111", in which all 8 bits are "1", and generates a data fragment 58C3, which is "00000010", by performing AND operation of the data "11111111" and the template information "00000010" stored in the template storage unit 55C3.

As a result, a data fragment generator 56C generates a data fragment 57C, which is "01000011", by performing OR operation of the data fragment 58C0, the data fragment 58C1, the data fragment 58C2, and the data fragment 58C3, and stores the data fragment 57C in a data fragment storage unit 52C. A transmitter-receiver 51C selects the data fragment 57C from the data fragment storage unit 52C, and transmits it as a bit string 14C to the transfer apparatus 20. The high-order 2 bits in the bit string 14C are the low-order 2 bits ("01") of the data 41C ("1101") to be transmitted to the controller 10, and the low-order 2 bits in the bit string 14C are the high-order 2 bits ("11") of the data 41C ("1101") to be transmitted to the controller 10. This means that the data 41C spans a border between the high-order 8 bits and the low-order 8 bits in the bit string 13.

In FIG. 1, in the transfer apparatus 20, the transmitter-receiver 24 transmits the received bit string 14A as the data fragment 32A to the operation unit 23, transmits the received bit string 14B to the operation unit 23 as the data fragment 32B, and transmits the received bit string 14C to the operation unit 23 as the data fragment 32C.

The data 41A ("01") included in the received data fragment 32A and the data 41B ("1101") included in the received data fragment 32B can be stored all in correspondence of 1:1 with respect to the low-order 8 bits in the bit string 13. Therefore, the operation unit 23 directly stores the data fragment 32A as data fragment 31A in the register 23a, and directly stores the data fragment 32B as data fragment 31B in the register 23b.

However, the data 41C ("01" and "11") included in the received data fragment 32C is divided into high-order 2 bits and low-order 2 bits. Therefore, the operation unit 23 sends the received data fragment 32C to the AND circuits 23c and 23d, so that these portions are separated from each other and the bit positions are rearranged.

The AND circuit 23c performs AND operation of the data "01000011" in the data fragment 32C and a constant "11000000" written as hexadecimal "C0", generates the data fragment 31Ca, which is "01000000", and stores the data fragment 31Ca in the register 23e. The AND circuit 23d performs AND operation of the data "01000011" in the data fragment 32C and a constant "00000011" written as hexadecimal "03", generates the data fragment 31Cb, which is "00000011", and designates the data fragment as a data fragment 28b.

The operation unit 23 generates the data fragment 28a, which is "01110101", by performing OR operation of the data fragment 31A stored in the register 23a, the data fragment 31B stored in the register 23b, and the data fragment 31Ca stored in the register 23e, and stores the data fragment in the transmission buffer 22 as the low-order data fragment 22a. The operation unit 23 also stores the data fragment 28b generated by the AND circuit 23d in the transmission buffer 22 as the high-order data fragment 22b. As a result, the transmitter 21 transmits the low-order data fragment 22a and the high-order data fragment 22b stored in the transmission buffer 22 to the controller 10 as the continuous bit string 13.

The contents of the process in which the transfer apparatus 20 generates the bit string 13 from the bit string 14q will be specifically explained, with reference to FIGS. 5 and 6. FIG. 5 illustrates a case that the transfer apparatus 20 executes the process by using an 8-bit microcomputer. FIG. 6 is a diagram to explain details of a process related to a part "d" shown in FIG. 5.

In FIG. 5, in the transfer processing, a constant defining section defines constants, a variable defining section declares variables, a variable initialization section sets an initial value of the variables, and then the value of the bit string 14q is stored in an array variable d14 according to a function get_sensor_actuator_network_data( ). Subsequently, in a for-loop, all the bit strings 14q are stored together in the array variable d13, and the array variable d13 is transmitted to the controller 10 as the bit string 13 according to a function set_field_network_data( ).

In FIG. 6, the processing for the part "d" shown in FIG. 5 is shown in column (A), a processing operation actually performed by a microcomputer is shown in column (B), and the required number of clock cycles is shown in column (C). In column (C), the number of clock cycles required for the microcomputer to execute the processing for one line is expressed as 1, the number of clock cycles for lines that are not executed as a result of condition decision is expressed as 0, the number of clock cycles for lines to be executed is expressed as 1, and the total of number of clock cycles is shown in the lowermost line.

In column (B) in FIG. 6, from step (1) to step (5), because value of a variable flag_of_separate[0] is 0x00, control proceeds to step (6). From step (6) to step (12), OR operation of a variable d13[0] in which 0x00 is stored in advance and the value of a variable d0 in which 0x01 is stored is performed, so that the value of the variable d13[0] is changed to 0x01. From step (13) to step (21), because 0x00 is stored in a variable p50q[0], processing of q=0 is complete, and control proceeds to processing of q=1. From step (41) to step (45), because a variable flag_of_separate[1] is 0x00, control proceeds to step (46). From step (46) to step (52), OR operation of a variable d0 in which 0x34 is stored and the variable d13[0] is performed, so that the value of the variable d13[0] is changed to 0x35. From step (53) to step (61), because 0x02 is stored in a variable p50q[1], processing of q=1 is complete, and control proceeds to processing of q=2.

From step (81) to step (85), because a variable flag_of_separate[3] is 0x01, control branches to step (102). From step (102) to step (120), AND operation of the variable d0 in which 0x43 is stored and a value 0xC0 is performed, and the result of OR operation of the AND result with the variable d13[0] is stored in the variable d13[0], to change the value of the variable d13[0] to 0x75. Further, the result of AND operation of the value of the variable d0 and a value 0x03 is stored in a variable d13[1], to change the value of the variable d13[1] to 0x03. Thus, the process for storing the bit string 14q in the array variable d13 is complete.

According to the above process, it is understood that, as shown in column (C) in FIG. 6, a total of 60 clock cycles is required to execute the process for the part "d" shown in FIG. 5, when the required number of clock cycles per command is 1 clock. On the other hand, in a conventional example (FIG. 21), 116 clock cycles are required for the data transfer. In other words, according to the embodiment, it is understood that the processing time of the transfer apparatus considerably reduces, because the transfer process can be completed within about half the number of clock cycles in the conventional example (FIG. 21).

FIGS. 7 and 8 are diagrams to specifically explain contents of a process in which the input/output unit 50q determines the bit string 14q to be transmitted to the transfer apparatus 20 from the input 54qk. FIG. 7 illustrates a case that the input/output unit 50$q$ uses an 8-bit microcomputer to execute the process. FIG. 8 illustrates details of the process related to part "e" shown in FIG. 7.

In FIG. 7, in the input/output unit 50$q$, a constant defining section defines constants, a variable defining section declares variables, and after initializing variables t55$gk$, the value of the input 54$qk$ (k=0 to 3) is stored in variables d54$qk$ according to a function get_port_status( ). After a value 0x00 is stored in a variable d52$q$, when the value of the variable d54$qk$ is not 0x00, OR operation of the value of the variable t55$qk$ and the variable d52$q$ is performed, to store the state of the input 54$qk$ in the variable d52$q$, and the variable d52$q$ is transmitted to the transfer apparatus 20 as the bit string 14$q$ according to the function set_sensor_actuator_network_data( ).

In FIG. 8, column (A) indicates the processing for the part "e" shown in FIG. 7, column (B) indicates a processing operation actually performed by a microcomputer, and column (C) indicates the required number of clock cycles. In column (C), the number of clock cycles required for the microcomputer to execute the processing for one line is expressed as 1, the number of clock cycles for lines that are not executed as a result of condition decision is expressed as 0, and the number of clock cycles for lines to be executed is expressed as 1, and the total of number of clock cycles is shown in the lowermost line.

In column (B) in FIG. 8, in step (1), the microcomputer in the input/output unit 50A stores a value 0x00 in the variable d52$q$. From step (2) to step (7), because the input 54A0 is ON, a value 0x01 is stored in a variable d54$q$0. That is, because the value of the variable d54$q$0 is different from 0x00, OR operation of the variable d52$q$ and the value 0x01 of the variable t55$q$0 is performed, to store the value 0x01 in the variable d52$q$. From step (8) to step (13), because the input 54A1 is OFF, a value 0x00 is stored in a variable d54$q$1. That is, because the value of the variable d54$q$1 is 0x00, OR operation is not performed with respect to the variable d52$q$, and the state of the input 54A0 and the input 54A1 is stored in the variable d52$q$, to finish the process.

According to the above process, it is understood that a total of 9 clock cycles is required, as shown in column (C) in FIG. 8, to execute the processing for the part "e" shown in FIG. 7, when the required number of clock cycles per one command is all 1 clock cycle. On the other hand, in a conventional example (FIG. 15), 9 clock cycles are required for executing the processing. In other words, according to the embodiment, the overall processing time of the transfer apparatus can be considerably reduced, while maintaining the processing time of the input/output unit.

INDUSTRIAL APPLICABILITY

As described above, the present invention is suitable as a data collection system in which one controller collects data individually from one or more input units, and the processing efficiency of which is improved.

The invention claimed is:

1. A data collection system comprising:
a controller that receives a bit string including a plurality of individual data of one or more input units;
a transfer apparatus that receives target bit strings including the individual data from corresponding input/output units, creates the bit string from the target bit strings received, and transmits the bit string to the controller; and
a plurality of the input/output units, each of which sends an input state to the transfer apparatus, the input state being included in the individual data, wherein
the transfer apparatus includes
a buffering unit that stores the bit string to be sent to the controller as data fragments;
a creating unit that creates the data fragments without performing bit shift operation, by performing logical operations on the target bit strings received from the input/output units, and
a transmitting unit that transmits the target bit strings received from the input/output units to the creating unit, and transmits template information to the respective input/output units, wherein the template information indicates an area where the individual data relative to the corresponding input/output unit is to be stored in the data fragments, and
wherein each of the input/output units include
a storing unit that stores the template information received from the transfer apparatus; and
a generating unit that generates the target bit strings including the individual data corresponding to the input/output unit to be transmitted to the transfer apparatus, based on the input state and the template information stored.

* * * * *